United States Patent
Smith et al.

(10) Patent No.: US 9,618,663 B2
(45) Date of Patent: Apr. 11, 2017

(54) RETROREFLECTIVE ARTICLES INCLUDING OPTICALLY ACTIVE AREAS AND OPTICALLY INACTIVE AREAS

(75) Inventors: Kenneth L. Smith, White Bear Lake, MN (US); Michael Benton Free, St. Paul, MN (US); Bimal V. Thakkar, Woodbury, MN (US); Raymond C. Chiu, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 983 days.

(21) Appl. No.: 13/641,271

(22) PCT Filed: Apr. 15, 2010

(86) PCT No.: PCT/US2010/031298
§ 371 (c)(1),
(2), (4) Date: Feb. 6, 2013

(87) PCT Pub. No.: WO2011/129833
PCT Pub. Date: Oct. 20, 2011

(65) Prior Publication Data
US 2013/0135731 A1 May 30, 2013

(51) Int. Cl.
*G02B 5/124* (2006.01)
*G02B 5/122* (2006.01)
*B32B 3/30* (2006.01)

(52) U.S. Cl.
CPC ............... *G02B 5/122* (2013.01); *B32B 3/30* (2013.01); *G02B 5/124* (2013.01)

(58) Field of Classification Search
CPC ............ G02B 5/124; G02B 5/122; B32B 3/30

USPC .................................................. 359/529–542
See application file for complete search history.

(56) References Cited

U.S. PATENT DOCUMENTS

| | | |
|---|---|---|
| 2,801,185 A | 7/1957 | Iler |
| 2,976,576 A | 3/1961 | Wichterle |
| 3,712,706 A | 1/1973 | Stamm |
| 3,924,929 A | 12/1975 | Holmen |
| 4,025,159 A | 5/1977 | McGrath |
| 4,127,693 A | 11/1978 | Lemelson |
| 4,202,600 A | 5/1980 | Burke |
| 4,243,618 A | 1/1981 | Van Arnam |
| 4,379,201 A | 4/1983 | Heilmann |
| 4,478,769 A | 10/1984 | Pricone |
| 4,522,958 A | 6/1985 | Das |
| 4,539,256 A | 9/1985 | Shipman |
| 4,563,404 A | 1/1986 | Bahary |
| 4,588,258 A | 5/1986 | Hoopman |
| 4,618,518 A | 10/1986 | Pricone |

(Continued)

FOREIGN PATENT DOCUMENTS

| | | |
|---|---|---|
| DE | 102007063471 | 12/2008 |
| EP | 142250 | 5/1985 |

(Continued)

OTHER PUBLICATIONS

"3M Reflectivity, How We See", Jan. 1, 2004, 2 pgs.

(Continued)

*Primary Examiner* — James Phan
(74) *Attorney, Agent, or Firm* — Trisha D. Adamson

(57) ABSTRACT

This disclosure generally relates to retroreflective articles and methods of making such articles.

19 Claims, 5 Drawing Sheets

(56) References Cited

U.S. PATENT DOCUMENTS

| | | |
|---|---|---|
| 4,656,072 A | 4/1987 | Coburn, Jr. |
| 4,672,089 A | 6/1987 | Pricone |
| 4,696,719 A | 9/1987 | Bischoff |
| 4,726,706 A | 2/1988 | Attar |
| 4,726,989 A | 2/1988 | Mrozinski |
| 4,737,559 A | 4/1988 | Kellen |
| 4,775,219 A | 10/1988 | Appeldorn |
| 4,801,193 A | 1/1989 | Martin |
| 4,842,893 A | 6/1989 | Yializis |
| 4,906,070 A | 3/1990 | Cobb, Jr. |
| 4,954,371 A | 9/1990 | Yializis |
| 5,056,892 A | 10/1991 | Cobb, Jr. |
| 5,120,594 A | 6/1992 | Mrozinski |
| 5,156,863 A | 10/1992 | Pricone |
| 5,219,120 A | 6/1993 | Ehrenberg |
| 5,229,882 A | 7/1993 | Rowland |
| 5,238,623 A | 8/1993 | Mrozinski |
| 5,261,949 A | 11/1993 | Schilling |
| 5,272,562 A | 12/1993 | Coderre |
| 5,528,720 A | 6/1996 | Winston |
| 5,601,911 A * | 2/1997 | Ochi et al. ............... 428/304.4 |
| 5,614,286 A | 3/1997 | Bacon, Jr. |
| 5,677,050 A | 10/1997 | Bilkadi |
| 5,691,846 A | 11/1997 | Benson, Jr. |
| 5,694,701 A | 12/1997 | Huelsman |
| 5,711,589 A | 1/1998 | Oe |
| 5,743,981 A | 4/1998 | Lu |
| 5,759,468 A | 6/1998 | Smith |
| 5,804,610 A | 9/1998 | Hamer |
| 5,808,713 A | 9/1998 | Broer |
| 5,814,355 A | 9/1998 | Shusta |
| 5,831,766 A | 11/1998 | Martin |
| 5,882,796 A | 3/1999 | Wilson |
| 5,919,555 A | 7/1999 | Yasuda |
| 5,930,041 A | 7/1999 | Thielman |
| 5,946,134 A | 8/1999 | Benson |
| 5,959,774 A | 9/1999 | Benson |
| 5,992,066 A | 11/1999 | Brauer |
| 5,993,954 A | 11/1999 | Radovanovic |
| 6,004,422 A | 12/1999 | Janovec |
| 6,012,647 A | 1/2000 | Ruta |
| 6,132,861 A | 10/2000 | Kang |
| 6,139,158 A | 10/2000 | Nilsen |
| 6,166,855 A | 12/2000 | Ikeyama |
| 6,204,202 B1 | 3/2001 | Leung |
| 6,210,485 B1 | 4/2001 | Zhao |
| 6,210,858 B1 | 4/2001 | Yasuda |
| 6,224,223 B1 | 5/2001 | Higuchi |
| 6,224,792 B1 | 5/2001 | Janovec |
| 6,231,797 B1 | 5/2001 | Bernard |
| 6,245,150 B1 | 6/2001 | Lyons |
| 6,254,675 B1 | 7/2001 | Aldinger |
| 6,285,001 B1 | 9/2001 | Fleming |
| 6,325,515 B1 | 12/2001 | Coderre |
| 6,350,035 B1 | 2/2002 | Smith |
| 6,355,759 B1 | 3/2002 | Sherman |
| 6,368,699 B1 | 4/2002 | Gilbert |
| 6,376,590 B2 | 4/2002 | Kolb |
| 6,383,559 B1 | 5/2002 | Nakamura |
| 6,413,882 B1 | 7/2002 | Leung |
| 6,457,823 B1 | 10/2002 | Cleary |
| 6,461,724 B1 | 10/2002 | Radovanovic |
| 6,521,047 B1 | 2/2003 | Brutti |
| 6,573,305 B1 | 6/2003 | Thunhorst |
| 6,645,331 B2 | 11/2003 | Northey |
| 6,656,571 B2 | 12/2003 | Benson |
| 6,677,028 B1 | 1/2004 | Lasch |
| 6,703,463 B2 | 3/2004 | Holguin |
| 6,719,426 B2 | 4/2004 | Magarill |
| 6,759,080 B2 | 7/2004 | Thunhorst |
| 6,797,396 B1 | 9/2004 | Liu |
| 6,843,571 B2 | 1/2005 | Sewall |
| 6,846,089 B2 | 1/2005 | Stevenson |
| 6,884,371 B2 | 4/2005 | Smith |
| 6,890,642 B2 | 5/2005 | Kaminsky |
| 6,899,944 B2 | 5/2005 | Tanaka |
| 6,917,400 B2 | 7/2005 | Nakamura |
| 6,958,860 B2 | 10/2005 | Dontula |
| 6,967,053 B1 | 11/2005 | Mullen |
| 6,984,429 B2 | 1/2006 | Thunhorst |
| 7,027,671 B2 | 4/2006 | Huck |
| 7,032,324 B2 | 4/2006 | Kolb |
| 7,068,910 B2 | 6/2006 | Duine |
| 7,072,544 B2 | 7/2006 | Cornelissen |
| 7,108,810 B2 | 9/2006 | Nakamura |
| 7,132,136 B2 | 11/2006 | Laney |
| 7,157,839 B2 | 1/2007 | Ouderkirk |
| 7,195,360 B2 | 3/2007 | Bacon, Jr. |
| 7,204,616 B2 | 4/2007 | Kitamura |
| 7,241,437 B2 | 7/2007 | Davidson |
| 7,241,478 B2 | 7/2007 | McNeish |
| 7,251,079 B2 | 7/2007 | Capaldo |
| 7,261,424 B2 | 8/2007 | Smith |
| 7,288,309 B2 | 10/2007 | Fleming |
| 7,293,884 B2 | 11/2007 | Sawayama |
| 7,309,135 B2 | 12/2007 | Smith |
| 7,327,415 B2 | 2/2008 | Brickey |
| 7,347,571 B2 | 3/2008 | Bacon, Jr. |
| 7,372,075 B2 | 5/2008 | Shigemura |
| 7,382,466 B2 | 6/2008 | Hill |
| 7,422,334 B2 | 9/2008 | Smith |
| 7,466,373 B2 | 12/2008 | Xu |
| 7,547,105 B2 | 6/2009 | Bacon, Jr. |
| 7,611,251 B2 | 11/2009 | Thakkar |
| 7,980,710 B2 | 7/2011 | Hayashi |
| 8,371,703 B2 | 2/2013 | Smith |
| 8,651,720 B2 | 2/2014 | Sherman |
| 2002/0034457 A1 | 3/2002 | Reichert |
| 2002/0061178 A1 | 5/2002 | Winston |
| 2003/0100637 A1 | 5/2003 | Mimura |
| 2003/0118750 A1 | 6/2003 | Bourdelais |
| 2003/0170442 A1 | 9/2003 | Kaminsky |
| 2004/0013856 A1 | 1/2004 | Araki |
| 2004/0056994 A1 | 3/2004 | Honda |
| 2004/0164325 A1 | 8/2004 | Siegel |
| 2005/0214453 A1 | 9/2005 | Kawanishi |
| 2006/0003178 A1 | 1/2006 | Strobel |
| 2006/0014012 A1 | 1/2006 | Thies |
| 2006/0019114 A1 | 1/2006 | Thies |
| 2006/0078696 A1 | 4/2006 | Furholz |
| 2006/0082700 A1 | 4/2006 | Gehlsen |
| 2006/0215079 A1 | 9/2006 | Suzuki |
| 2006/0216455 A1 | 9/2006 | Soaft |
| 2006/0264623 A1 | 11/2006 | Smith |
| 2006/0275595 A1 | 12/2006 | Thies |
| 2007/0020404 A1 | 1/2007 | Seiberle |
| 2007/0065638 A1 | 3/2007 | Wang |
| 2007/0121211 A1 | 5/2007 | Watanabe |
| 2007/0189038 A1 | 8/2007 | Pokorny |
| 2007/0201246 A1 | 8/2007 | Yeo |
| 2007/0286993 A1 | 12/2007 | Radcliffe |
| 2008/0037127 A1 | 2/2008 | Weber |
| 2008/0043490 A1 | 2/2008 | Coleman |
| 2008/0064133 A1 | 3/2008 | Lee |
| 2008/0151375 A1 | 6/2008 | Lin |
| 2008/0192352 A1 | 8/2008 | Laney |
| 2008/0214075 A1 | 9/2008 | Marte |
| 2008/0220554 A1 | 9/2008 | Shigemura |
| 2008/0248312 A1 | 10/2008 | Thies |
| 2008/0305282 A1 | 12/2008 | Inakura |
| 2009/0029145 A1 | 1/2009 | Thies |
| 2009/0074976 A1 | 3/2009 | Freking |
| 2009/0122405 A1 | 5/2009 | Mimura |
| 2009/0209028 A1 | 8/2009 | Dong |
| 2010/0103521 A1 | 4/2010 | Smith |
| 2010/0265584 A1 | 10/2010 | Coggio |
| 2012/0037025 A1 | 2/2012 | Patel |
| 2012/0038850 A1 | 2/2012 | Hao |
| 2012/0038984 A1 | 2/2012 | Patel |

(56) References Cited

U.S. PATENT DOCUMENTS

| | | |
|---|---|---|
| 2013/0034682 A1 | 2/2013 | Free |
| 2013/0114142 A1 | 5/2013 | Free |
| 2013/0135731 A1 | 5/2013 | Smith |

FOREIGN PATENT DOCUMENTS

| | | |
|---|---|---|
| EP | 989443 | 3/2000 |
| EP | 1002830 | 5/2000 |
| EP | 1022587 | 7/2000 |
| EP | 1450202 | 8/2004 |
| EP | 1479734 | 11/2004 |
| EP | 2131218 | 12/2009 |
| GB | 1188736 | 4/1970 |
| GB | 1476447 | 6/1977 |
| GB | 2254826 | 10/1992 |
| JP | 6-186408 | 7/1994 |
| JP | 6347621 | 12/1994 |
| JP | 2003-084113 | 3/2003 |
| JP | 2005266343 | 9/2005 |
| JP | 2008003243 | 1/2008 |
| JP | 2009082890 | 4/2009 |
| WO | WO 95/11464 A2 | 4/1995 |
| WO | WO 97/37249 A1 | 10/1997 |
| WO | WO 98/17466 | 4/1998 |
| WO | WO 99/63368 A1 | 5/1998 |
| WO | WO 00/43813 A1 | 7/2000 |
| WO | WO 01/04954 | 1/2001 |
| WO | WO 03/064304 | 8/2003 |
| WO | WO 2004/027474 | 4/2004 |
| WO | WO 2005/052557 | 6/2005 |
| WO | WO 2006/076320 | 7/2006 |
| WO | WO 2006/096258 | 9/2006 |
| WO | WO 2006/120638 | 11/2006 |
| WO | WO 2006/124588 | 11/2006 |
| WO | WO 2007/031539 | 3/2007 |
| WO | WO 2007/031541 | 3/2007 |
| WO | WO 2007/065847 | 6/2007 |
| WO | WO 2007/124217 | 11/2007 |
| WO | WO 2008/011919 | 1/2008 |
| WO | WO 2008/098872 | 8/2008 |
| WO | WO 2008/144136 | 11/2008 |
| WO | WO 2008/144644 | 11/2008 |
| WO | WO 2008/144656 | 11/2008 |
| WO | WO 2010/059566 | 5/2010 |
| WO | WO 2010/059568 | 5/2010 |
| WO | WO 2010/059579 | 5/2010 |
| WO | WO 2010/059614 | 5/2010 |
| WO | WO 2010/120422 | 10/2010 |
| WO | WO 2010/120468 | 10/2010 |
| WO | WO 2010/120845 | 10/2010 |
| WO | WO 2010/120864 | 10/2010 |
| WO | WO 2010/120871 | 10/2010 |
| WO | WO 2010/120971 | 10/2010 |
| WO | WO 2010/121019 | 10/2010 |
| WO | WO 2010/121054 | 10/2010 |
| WO | WO 2010/121056 | 10/2010 |
| WO | WO 2011/050232 | 4/2011 |
| WO | WO 2011/129831 | 10/2011 |
| WO | WO 2011/129832 | 10/2011 |
| WO | WO 2011/129833 | 10/2011 |

OTHER PUBLICATIONS

ASTM Designation: D 1003-00, "Standard Test Method for Haze and Luminous Transmittance of Transparent Plastics", 2000, pp. 1-6.
Boisvert, Influence of Structural Properties of Nanoporous Silica-Polymer Materials on Ink Absorption, Nordic Pulp and Paper Research Journal, vol. 18, No. 2, pp. 210-216, (2003).
Brunauer, Adsorption of Gases in Multimolecular Layers, vol. 60, pp. 309-319, (Feb. 1938).
Cornelissen, Efficient and Cost-Effective Polarized-Light Backlights for LCDs, Proc. of SPIE, vol. 7058, pp. 1-10, (2008).
Haze, Applications Note, vol. 9, No. 6, pp. 1-4, (2008).
Ibn-Elhaj, Optical Polymer Thin Films With Isotropic and Anisotropic Nano-Corrugated Surface Topologies, Nature, vol. 410, pp. 796-799, (Apr. 12, 2001).
Kemsley, Modernizing TLC, New Instrumentation, Materials, and Analysis Techniques Take Lab Staple Into High-Performance Arena, Chemical & Engineering News, vol. 87, No. 20, pp. 11-18, (May 18, 2009).
Miyamoto, Control of Refractive Index of Pressure-Sensitive Adhesives for the Optimization of Multilayered Media, Jpn. J. Appl. Phys., vol. 46, pp. 3978-3980, (2007).
Patton, "Pigment/Binder Geometry", Paint Flow and Pigment Dispersion: A Rheological Approach to Coating and Ink Technology, Chapter 5, 2nd Edition, Wiley & Sons, pp. 126-180, (1978).
Peng, Enhanced Coupling of Light From Organic Light Emitting Diodes Using Nanopourous Films, J. Appl. Phys., vol. 96, No. 3, pp. 1649-1654, (Aug. 1, 2004).
Polymer Handbook, Bandrup, Immergut, and Grulke, 4th Edition, Parts 1-VIII, (1999).
Rohr, Photografting and the Control of Surface Chemistry in Three-Dimensional Porous Polymer Monoliths, Macromolecules, vol. 36, pp. 1677-1684, (2003).
Shen, Low Dielectric Constant Silica Films With Ordered Nanoporous Structure, Materials Science and Engineering, C 27, pp. 1145-1148, (2007).
Smith, Driver-Focused Design of Retroreflective Sheeting for Traffic Signs, $87^{th}$ Annual Meeting of Transportation Research Board, pp. 1-17, (Jan. 13-17, 2008).
Sudduth, Modeling Cluster Voids and Pigment Distribution to Predict Properties and CPVC in Coatings, Part 1: Dry Coating Analysis, Pigment and Resin Technology, vol. 37, No. 6, pp. 375-388, (2008).
Tsutsui, Doubling Coupling-Out Efficiency in Organic Light-Emitting Devices Using a Thin Silica Aerogel Layer, Adv. Mater., vol. 13, No. 15, pp. 1149-1152, (Aug. 3, 2001).
"Visual Acuity", NDT Resource Center, Iowa State University [online], [retrieved from the internet on Jun. 24, 2011], http://www.ndt.org/EducationResources/CommunityCollege/PenetrantTest/Introduction/visualacuity.htm, 3 pages.
"Visual Acuity", Wikipedia, [online], [retrieved from the internet on Jun. 24, 2011], http://en.wikipedia.org/wiki/Visual_acuity#Visual_acuity_expression, 13 pages.
Walheim, Nanophase-Separated Polymer Films As High-Performance Antireflection Coatings, Science, vol. 283, pp. 520-522, (1999).
"Why Some Paints are Transparent and Others Opaque, Light and Color Effects in Painting: Refractive Index", Natural Pigments, George O'Hanlon, Natural Pigments LLC, Willits, CA, USA [online], [retrieved from the internet on May 26, 2010], <www.naturalpigments.com/education/article.asp?ArticleD=8>, 9 pages.
Yoder, Jr., Study of Light Deviation Errors in Triple Mirrors and Tetrahedral Prisms, J. Optical Soc. Am., vol. 48, No. 7, pp. 496-499, (Jul. 1958).
Yu, Comparison of Different Measurement Methods for Transmittance Haze, Metrologia, vol. 46, pp. 233-237, (2009). (XP002603289).
Yu, Preparation of Monolithic Polymers With Controled Porous Properties for Microfluidic Chip Applications Using Photoinitiated Free-Radical Polymerization, J. of Polymer Science, Part A, Polymer Chemistry, vol. 40, pp. 755-769, (2002).
ASTM D 4956-07, "Standard Specification for Retroreflective Sheeting for Traffic Control" 2007, pp. 504-515.
Oliveri, "Fabrication and Characterization of Polymeric Optical Waveguides Using Standard Silicon Processing Technology", IEEE Xplore, Jun. 2005, pp. 1-6.
Intl Search Report, PCT/US2010/027433, 8 pages.
Written Opinion, PCT/US2010/027433, 15 pages.
Intl Search Report, PCT/US2010/028777, 4 pages.
Written Opinion, PCT/US2010/028777, 8 pages.
Intl Search Report, PCT/US2010/030984, 5 pages.
Written Opinion, PCT/US2010/030984, 9 pages.
Intl Search Report, PCT/US2010/031010, 8 pages.
Written Opinion, PCT/US2010/031010, 12 pages.

(56) References Cited

OTHER PUBLICATIONS

Intl Search Report, PCT/US2010/031019, 7 pages.
Written Opinion, PCT/US2010/031019, 11 pages.
Intl Search Report, PCT/US2010/031149, 6 pages.
Written Opinion, PCT/US2010/031149, 8 pages.
Intl Search Report, PCT/US2010/031225, 4 pages.
Written Opinion, PCT/US2010/031225, 10 pages.
Intl Search Report, PCT/US2010/031276, 2 pages.
Written Opinion, PCT/US2010/031276, 4 pages.
Intl Search Report, PCT/US2010/031278, 2 pages.
Written Opinion, PCT/US2010/031278, 6 pages.
Intl Search Report, PCT/US2010/031284, 2 pages.
Written Opinion, PCT/US2010/031284, 5 pages.
Intl Search Report, PCT/US2010/031290, 3 pages.
Written Opinion, PCT/US2010/031290, 1 page.
Intl Search Report, PCT/US2010/031298, 3 pages.
Written Opinion, PCT/US2010/031298, 6 pages.
Extended European Search Report dated Dec. 12, 2013 issued in European Patent Publication No. 2 558 290.

* cited by examiner

RETROREFLECTIVE ARTICLES INCLUDING OPTICALLY ACTIVE AREAS AND OPTICALLY INACTIVE AREAS

TECHNICAL FIELD

This disclosure generally relates to retroreflective articles and methods of making such articles.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are optical element sheeting (e.g., cube corner sheeting) and microsphere-based sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

Typically, a cube corner element includes three mutually perpendicular optical faces that intersect at a single apex. Generally, light that is incident on a corner cube element from a light source is totally internally reflected from each of the three perpendicular cube corner optical faces and is redirected back toward the light source. Presence of, for example, dirt, water, and adhesive on the optical faces can prevent total internal reflection (TIR) and lead to a reduction in the retroreflected light intensity. As such, the air interface is typically protected by a sealing film. However, sealing films may reduce the total active area, which is the area over which retroreflection can occur. Further, sealing films increase the manufacturing cost. Additionally, the sealing process can create a visible pattern in the retroreflective sheeting that is undesirable for many applications, such as, for example, use in a license plate and/or in commercial graphics applications where a more uniform appearance is generally preferred. Metalized cube corners do not rely on TIR for retroreflective light, but they are typically not white enough for daytime viewing of, for example, signing applications. Furthermore, the durability of the metal coatings may be inadequate.

SUMMARY

The inventors of the present application have formed retroreflective article without sealing films and/or metalized cube corners.

Some embodiments of the retroreflective articles of the present disclosure include one or more optically active areas in which incident light is retroreflected by a structured surface including, for example, cube corner elements, and one or more optically inactive areas in which incident light is not substantially retroreflected by the structured surface. The one or more optically active areas include a low refractive index layer or material adjacent to a portion of the structured surface. The one or more optically inactive areas include a pressure sensitive adhesive adjacent to a portion of the structured surface. The pressure sensitive adhesive substantially destroys the retroreflectivity of the portions of the structured surface that are directly adjacent thereto. The low refractive index layer assists in maintaining the retroreflectivity of the adjacent structured surface by forming a "barrier" between the structured surface and the pressure sensitive adhesive.

Some embodiments of the retroreflective articles of the present disclosure include a barrier layer between the pressure sensitive adhesive and the low refractive index layer. The barrier layer has sufficient structural integrity to substantially prevent flow of the pressure sensitive adhesive into the low refractive index layer. Exemplary materials for inclusion in the barrier layer include resins, polymeric materials, inks, dyes, and vinyls. In some embodiments, the barrier layer traps a low refractive index material in the low refractive index layer. Low refractive index materials are materials that have an index of refraction that is less than 1.3.

Some embodiments of the present disclosure generally relate to a retroreflective article, comprising: a retroreflective layer including multiple cube corner elements that collectively form a structured surface that is opposite a major surface; and a sealing layer having a first region and a second region, wherein the second region is in contact with the structured surface and wherein the second region surrounds the first region to form at least one cell with a cell size; and a low refractive index layer between the first region and the structured surface of the retroreflective layer, wherein the first region has a cell size that is less than 1000 microns.

Some embodiments of the present disclosure generally relate to a retroreflective article, comprising: a retroreflective layer including a structured surface that is opposite a major surface; a sealing layer that contacts at least a portion of the structured surface to form an optically inactive area that does not substantially retroreflect incident light; and at least one low refractive index layer forming an optically active area that retroreflects incident light and is surrounded by the optically inactive area to form at least one cell, wherein the cell size is below 1000 microns.

Some of the embodiments of the present disclosure generally relate to a method of forming a retroreflective article, comprising: providing a retroreflective layer including a structured surface that is opposite a second major surface; and applying a sealing layer having a first region and a second region, wherein the second region is in contact with the structured surface and surrounds the first region to form at least one cell with a cell size; and forming a low refractive index layer between the first region and the structured surface of the retroreflective layer, wherein the cell size for said first region is below 1000 microns.

BRIEF DESCRIPTION OF DRAWINGS

The present disclosure may be more completely understood and appreciated in view of the following detailed description of various embodiments in connection with the accompanying drawings, in which.

DETAILED DESCRIPTION

Figure 1A:
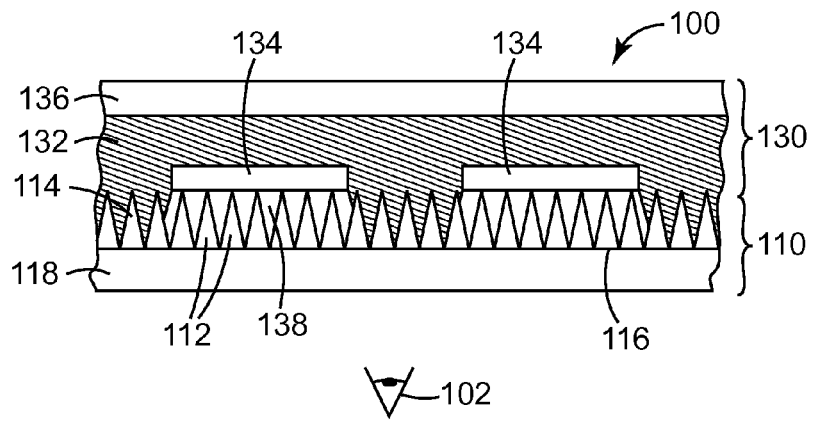
FIGS. 1A and 1B are schematic side views of one exemplary embodiment of a retroreflective article of the present disclosure.
Figure 1B:
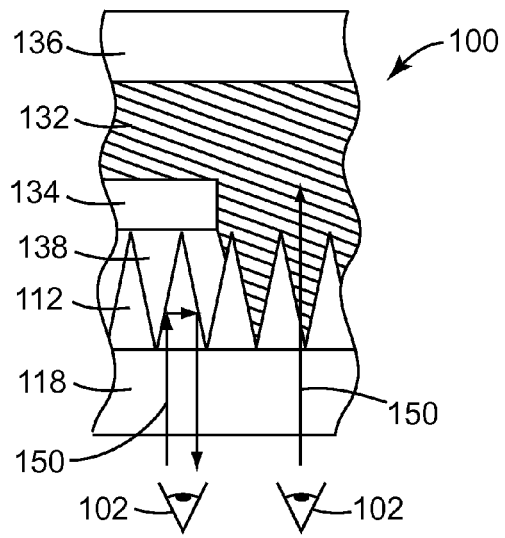

FIGS. 1A and 1B show one exemplary embodiment of a retroreflective article 100 that faces viewer 102. Retroreflective article 100 includes a retroreflective layer 110 including multiple cube corner elements 112 that collectively form a structured surface 114 opposite a major surface 116. Retroreflective layer 110 also includes an overlay layer 118. A pressure sensitive adhesive layer 130 is adjacent to retroreflective layer 110. Pressure sensitive adhesive layer 130 includes a pressure sensitive adhesive 132, one or more barrier layers 134, and a liner 136. Barrier layer 134 has sufficient structural integrity to prevent pressure sensitive adhesive 132 from flowing into a low refractive index layer 138 that is between structured surface 114 and barrier layer 134. Barrier layer 134 can directly contact or be spaced apart from or can push slightly into the tips of cube corner elements 112.

Where present, barrier layers 134 form a physical "barrier" between pressure sensitive adhesive 130 and cube corner elements 112. Barrier layers may prevent wetting of cube tips or surfaces by the pressure sensitive either initially during fabrication of the retroreflective article or over time due to the to viscoelastic nature of the adhesive. A trapped layer between pressure sensitive adhesive 130 and cube corner elements 112 is low refractive index layer 138. Low refractive index layer is thereby enclosed. If a protective layer is applied thereto, the low refractive index layer is encapsulated. Encapsulation of the low refractive index layer maintains and/or protects the integrity of the low refractive index layer. The presence of the barrier layer permits the portions of structured surface 114 adjacent to low refractive index layer 138 and/or barrier layers 134 to retroreflect incident light 150. Barrier layers 134 may also prevent pressure sensitive adhesive 130 from wetting out the cube sheeting. Pressure sensitive adhesive 130 that is not in contact with a barrier layer 134 adheres to the cube corner elements, thereby effectively sealing the retroreflective areas to form optically active areas or cells. Pressure sensitive adhesive 130 also holds the entire retroreflective construction together, thereby eliminating the need for a separate sealing film and sealing process. In some embodiments, the pressure sensitive adhesive is in intimate contact with or is directly adjacent to the structured surface or the cube corner elements.

As is shown in FIG. 1B, a light ray 150 incident on a cube corner element 112 that is adjacent to low refractive index layer 138 is retroreflected back to viewer 102. For this reason, an area of retroreflective article 100 that includes low refractive index layer 138 is referred to as an optically active area. In contrast, an area of retroreflective article 100 that does not include low refractive index layer 138 is referred to as an optically inactive area because it does not substantially retroreflect incident light.

Low refractive index layer 138 includes a material that has a refractive index that is less than about 1.30, less than about 1.25, less than about 1.2, less than about 1.15, less than about 1.10, or less than about 1.05. Exemplary low refractive index materials include air and low index materials (e.g., low refractive index materials described in U.S. Patent Application No. 61/324,249, which is hereby incorporated herein by reference).

In general, any material that prevents the pressure sensitive adhesive from contacting cube corner elements 112 or flowing or creeping into low refractive index layer 138 can be used in barrier layer 134. Exemplary materials for use in barrier layer 134 include resins, polymeric materials, dyes, inks, vinyl, inorganic materials, UV-curable polymers, pigment, particle, and bead. The size and spacing of the barrier layers can be varied. In some embodiments, the barrier layers may form a pattern on the retroreflective sheeting. In some embodiments, one may wish to reduce the visibility of the pattern on the sheeting. In general, any desired pattern can be generated by combinations of the described techniques, including, for example, indicia such as letters, words, alphanumerics, symbols, or even pictures. The patterns can also be continuous, discontinuous, monotonic, serpentine, any smoothly varying function, stripes, varying in the machine direction, the transverse direction, or both; the pattern can form an image, logo, or text, and the pattern can include patterned coatings and/or perforations. In some embodiments, the printed areas and/or unprinted areas can form a security feature. The pattern can include, for example, an irregular pattern, a regular pattern, a grid, words, graphics, images lines, and intersecting zones that form cells.

In at least some embodiments, the pressure sensitive adhesive layer includes a first region and a second region. The second region is in direct or intimate contact with the structured surface. The first and second regions have sufficiently different properties to form and separate the low refractive index layer between and from the pressure sensitive adhesive layer and the structured surface of the retroreflective layer. In some embodiments, the second region includes a pressure sensitive adhesive and the first region differs in composition from the second region. In some embodiments, the first region and the second region have different polymer morphology. In some embodiments, the first region and the second region have different flow properties. In some embodiments, the first region and the second region have different viscoelastic properties. In some embodiments, the first region and the second region have different adhesive properties. In some embodiments, the retroreflective article includes a plurality of second regions that form a pattern. In some embodiments, the pattern is one of an irregular pattern, a regular pattern, a grid, words, graphics, and lines.

Exemplary pressure sensitive adhesives for use in the retroreflective articles of the present disclosure include crosslinked tackified acrylic pressure-sensitive adhesives. Other pressure sensitive adhesives such as blends of natural or synthetic rubber and resin, silicone or other polymer systems, with or without additives can be used. The PSTC (pressure sensitive tape council) definition of a pressure sensitive adhesive is an adhesive that is permanently tacky at room temperature which adheres to a variety of surfaces with light pressure (finger pressure) with no phase change (liquid to solid).

Acrylic Acid and Meth(acrylic) Acid Esters: The acrylic esters are present at ranges of from about 65 to about 99 parts by weight, preferably about 78 to about 98 parts by weight, and more preferably about 90 to about 98 parts by weight. Useful acrylic esters include at least one monomer selected from the group consisting of a first monofunctional acrylate or methacrylate ester of a non-tertiary alkyl alcohol, the alkyl group of which comprises from 4 to about 12 carbon atoms, and mixtures thereof. Such acrylates or methacrylate esters generally have, as homopolymers, glass transition temperatures below about $-25°$ C. A higher amount of this monomer relative to the other comonomers affords the PSA higher tack at low temperatures.

Preferred acrylate or methacrylate ester monomers include, but are not limited to, those selected from the group consisting of n-butyl acrylate (BA), n-butyl methacrylate, isobutyl acrylate, 2-methyl butyl acrylate, 2-ethylhexyl acrylate, n-octyl acrylate, isooctyl acrylate (IOA), isooctyl methacrylate, isononyl acrylate, isodecyl acrylate, and mixtures thereof.

Particularly preferred acrylates include those selected from the group consisting of isooctyl acrylate, n-butyl acrylate, 2-methyl butyl acrylate, 2-ethylhexyl acrylate, and mixtures thereof.

Polar Monomers: Low levels of (typically about 1 to about 10 parts by weight) of a polar monomer such as a carboxylic acid can be used to increase the cohesive strength of the pressure-sensitive adhesive. At higher levels, these polar monomers tend to diminish tack, increase glass transition temperature and decrease low temperature performance.

Useful copolymerizable acidic monomers include, but are not limited to, those selected from the group consisting of ethylenically unsaturated carboxylic acids, ethylenically unsaturated sulfonic acids, and ethylenically unsaturated phosphonic acids. Examples of such monomers include those selected from the group consisting of acrylic acid (AA), methacrylic acid, itaconic acid, fumaric acid, crotonic acid, citraconic acid, maleic acid, .beta.-carboxyethyl acrylate, sulfoethyl methacrylate, and the like, and mixtures thereof.

Other useful copolymerizable monomers include, but are not limited to, (meth)acrylamides, N,N-dialkyl substituted (meth)acrylamides, N-vinyl lactams, and N,N-dialkylaminoalkyl (meth)acrylates. Illustrative examples include, but are not limited to, those selected from the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, N-vinyl pyrrolidone, N-vinyl caprolactam, and the like, and mixtures thereof.

Non-polar Ethylenically Unsaturated Monomers: The non-polar ethylenically unsaturated monomer is a monomer whose homopolymer has a solubility parameter as measured by the Fedors method (see Polymer Handbook, Bandrup and Immergut) of not greater than 10.50 and a Tg greater than $15°$ C. The non-polar nature of this monomer tends to improve the low energy surface adhesion of the adhesive. These non-polar ethylenically unsaturated monomers are selected from the group consisting of alkyl (meth)acrylates, N-alkyl (meth)acrylamides, and combinations thereof. Illustrative examples include, but are not limited to, 3,3,5-trimethylcyclohexyl acrylate, 3,3,5-trimethylcyclohexyl methacrylate, cyclohexyl acrylate, cyclohexyl methacrylate, isobornyl acrylate, isobornyl methacrylate, N-octyl acrylamide, N-octyl methacrylamide or combinations thereof. Optionally, from 0 to 25 parts by weight of a non-polar ethylenically unsaturated monomer may be added.

Tackifiers: Preferred tackifiers include terpene phenolics, rosins, rosin esters, esters of hydrogenated rosins, synthetic hydrocarbon resins and combinations thereof. These provide good bonding characteristics on low energy surfaces. Hydrogenated rosin esters and hydrogenated C9 aromatic resins are the most preferred tackifiers because of performance advantages that include high levels of "tack", outdoor durability, oxidation resistance, and limited interference in post crosslinking of acrylic PSAs.

Tackifiers may be added at a level of about 1 to about 65 parts per 100 parts of the monofunctional acrylate or methacrylate ester of a non-tertiary alkyl alcohol, the polar monomer, and the nonpolar ethylenically unsaturated monomer to achieve desired "tack". Preferably, the tackifier has a softening point of about 65 to about 100.degree.C. However, the addition of tackifiers can reduce shear or cohesive strength and raise the Tg of the acrylic PSA, which is undesirable for cold temperature performance.

Crosslinkers: In order to increase the shear or cohesive strength of acrylic pressure-sensitive adhesives, a crosslinking additive is usually incorporated into the PSA. Two main types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (CAS No. 7652-64-4), referred to herein as "bisamide". Such chemical crosslinkers can be added into solvent-based PSAs after polymerization and activated by heat during oven drying of the coated adhesive.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals, which bring about a crosslinking reaction of the polymer. A common free radical generating reagent is benzoyl peroxide. Free radical generators are required only in small quantities, but generally require higher temperatures to complete the crosslinking reaction than those required for the bisamide reagent.

The second type of chemical crosslinker is a photosensitive crosslinker that is activated by high intensity ultraviolet (UV) light. Two common photosensitive crosslinkers used for hot melt acrylic PSAs are benzophenone and 4-acryloxybenzophenone, which can be copolymerized into the PSA polymer. Another photocrosslinker, which can be post-added to the solution polymer and activated by UV light is a triazine; for example 2,4-bis(trichloromethyl)-6-(4-methoxy-phenyl)-s-triazine. These crosslinkers are activated by UV light generated from artificial sources such as medium pressure mercury lamps or a UV blacklight.

Hydrolyzable, free-radically copolymerizable crosslinkers, such as monoethylenically unsaturated mono-, di- and trialkoxy silane compounds including, but not limited to, methacryloxypropyltrimethoxysilane (SILANE™ A-174 available from Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinking agents.

Crosslinker is typically present from 0 to about 1 part by weight based on 100 parts by weight of acrylic acid or meth(acrylic) acid esters, polar monomers, and non-polar ethylenically unsaturated monomers.

Aside from thermal, moisture, or photosensitive cross-linkers, crosslinking may also be achieved using high-energy electromagnetic radiation such as gamma or e-beam radiation. In this case, no crosslinker may be required.

Other Additives: Because acrylic pressure-sensitive adhesives have excellent oxidative stability, additives such as antioxidant and UV light absorbers are generally not needed. Small amounts of heat stabilizer can be utilized in hot melt acrylic PSAs to increase thermal stability during processing.

Plasticizers: Optionally, low levels of plasticizer (e.g., less than about 10 parts by weight) may be combined with tackifier to adjust the Tg in order to optimize the peel and the low temperature performance of the adhesive. Plasticizers that may be added to the adhesive of the invention may be selected from a wide variety of commercially available materials. In each case, the added plasticizer must be compatible with the tackified acrylic PSA used in the formulation. Representative plasticizers include polyoxyethylene aryl ether, dialkyl adipate, 2-ethylhexyl diphenyl phosphate, t-butylphenyl diphenyl phosphate, di(2-ethylhexyl)adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate.

Various polymeric film substrates comprised of various thermosetting or thermoplastic polymers are suitable for use as the overlay and body layer. The body layer may be a single layer or multi-layer film. Illustrative examples of polymers that may be employed as the body layer film for flexible retroreflective articles include (1) fluorinated polymers such as poly(chlorotrifluoroethylene), poly(tetrafluoroethylene-co-hexafluoropropylene), poly(tetrafluoroethylene-co-perfluoro(alkyl)vinylether), poly(vinylidene fluoride-co-hexafluoropropylene); (2) ionomeric ethylene copolymers poly(ethylene-co-methacrylic acid) with sodium or zinc ions such as SURLYN-8920 Brand and SURLYN-9910 Brand available from E.I. duPont Nemours, Wilmington, Del.; (3) low density polyethylenes such as low density polyethylene; linear low density polyethylene; and very low density polyethylene; plasticized vinyl halide polymers such as plasticized poly(vinylchloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or CH3 (CH2)n- where n is 0 to 12, and poly(ethylene-co-vinylacetate) "EVA"; and (5) (e.g.) aliphatic polyurethanes. The body layer is preferably an olefinic polymeric material, typically comprising at least 50 wt-% of an alkylene having 2 to 8 carbon atoms with ethylene and propylene being most commonly employed. Other body layers include for example poly(ethylene naphthalate), polycarbonate, poly (meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate, polystyrene, styrene-acrylonitrile copolymers, cyclic olefin copolymers, epoxies, and the like.

Exemplary liners for use in the retroreflective articles of the present disclosure include silicone coated materials such as papers and polymeric films, including plastics. The liner base material may be single or multiple layer. Specific examples include: polyester (for example polyethylene terephthalate), polyethylene, polypropylene (including cast and biaxially oriented polypropylene), and papers (including clay coated paper, polyethylene coated paper or a polyethylene coated poly(ethylene terephthalate) film.

In some embodiments, such as in retroreflective article 100, cube corner elements 112 are in the form of a tetrahedron or a pyramid. The dihedral angle between any two facets may vary depending on the properties desired in an application. In some embodiments (including the one shown in FIGS. 1A and 1B), the dihedral angle between any two facets is 90 degrees. In such embodiments, the facets are substantially perpendicular to one another (as in the corner of a room) and the optical element may be referred to as a cube corner. Alternatively, the dihedral angle between adjacent facets can deviate from 90° as described, for example, in U.S. Pat. No. 4,775,219, the disclosure of which is incorporated in its entirety herein by reference. Alternatively, the optical elements in the retroreflective article can be truncated cube corners. The optical elements can be full cubes, truncated cubes, or preferred geometry (PG) cubes as described in, for example, U.S. Pat. No. 7,422,334, the disclosure of which is incorporated in its entirety herein by reference. Each retroreflecting optical element includes a symmetry axis that makes equal angles with the facets. In some embodiments, the symmetry axis is perpendicular to a base or front surface. In some embodiments, the symmetry axis is not perpendicular to the base or the front surface and the apex or optical element is canted as described, for example, in U.S. Pat. No. 4,588,258, the disclosure of which is incorporated in its entirety herein by reference. Retroreflective layer 110 of FIGS. 1A and 1B is shown as including overlay layer 118 and no land layer or land portion. A land layer may be defined as continuous layer of material coextensive with the cube corner elements and composed of the same material. This construction may be desirable for flexible embodiments. Those of skill in the art will appreciate that retroreflective layer 110 can include a land layer or land portion.

Figure 2:
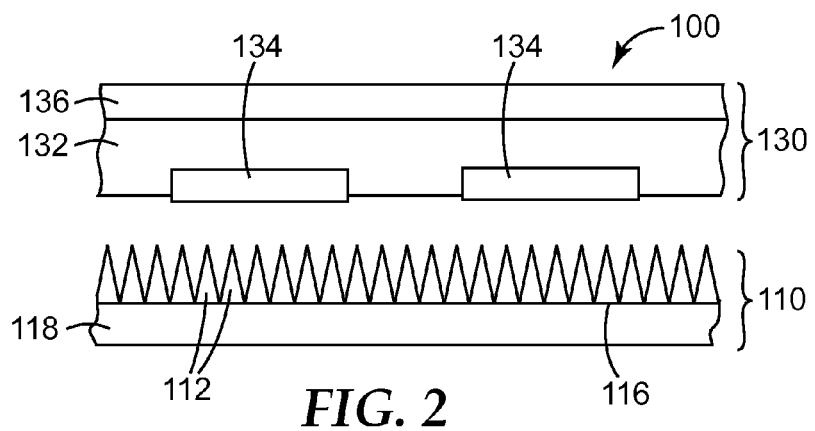
FIG. 2 is schematic drawing of one exemplary intermediary step in forming the retroreflective article of FIG. 1.

As is schematically shown in FIG. 2, one method of making at least some of the retroreflective articles of the present disclosure involves placing barrier layer material 134 onto a pressure sensitive adhesive material 132 and then laminating the resulting pressure sensitive adhesive layer 130 to a retroreflective layer 110. The pressure sensitive adhesive layer 130 can be formed in a variety of ways including but not limited to the following exemplary methods. In one exemplary embodiment, the material(s) forming the barrier layer are printed onto the pressure sensitive adhesive. The method of printing can be, a non-contact method such as, for example, printing using an inkjet printer. The method of printing can be a contact printing method such as, for example, flexographic printing. In another exemplary embodiment, the material(s) forming the barrier layer are printed onto a flat release surface using, for example, an inkjet or screen printing method, and are then subsequently transferred from the flat release surface onto the pressure sensitive adhesive. In another exemplary embodiment, the material(s) forming the barrier layer are flood coated onto a microstructured adhesive surface (e.g., a Comply liner manufactured by 3M Company of St. Paul, Minn.). The barrier layer material is subsequently transferred from the microstructured liner to the pressure sensitive adhesive by, for example, lamination. The retroreflective article may then, optionally, be adhesively bonded to a substrate (e.g., an aluminum substrate) to form, for example, a license plate or signage.

Figure 3:
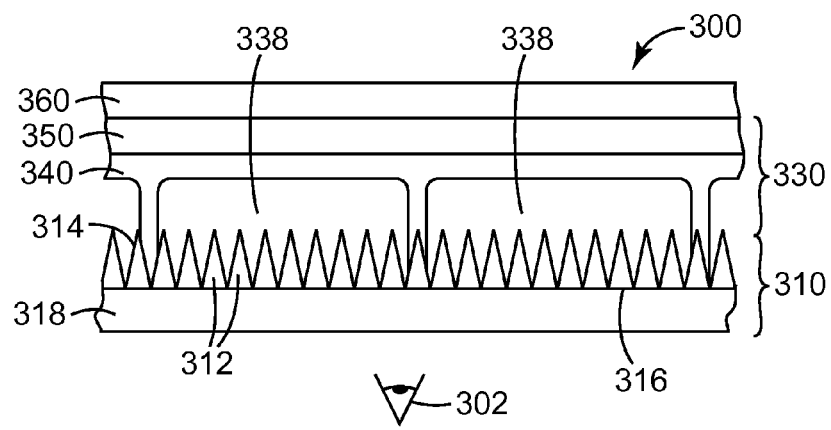
FIG. 3 is a schematic drawing of one exemplary embodiment of a retroreflective article of the present disclosure.
Figure 5:
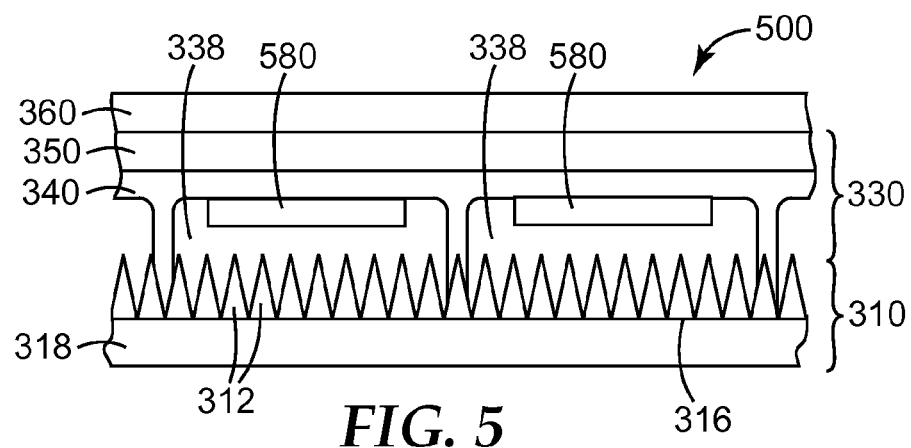
FIG. 5 is a schematic drawing of one exemplary embodiment of a retroreflective article of the present disclosure.

FIGS. 3 and 5 show some alternative exemplary retroreflective articles of the present disclosure. Specifically, FIGS. 3 and 5 show retroreflective articles including structured sealing layers. In some embodiments the sealing layer includes at least one of, for example, a thermoplastic polymer, a cross-linkable material, and a radiation curable material. In some embodiments the sealing layer comprises an adhesive, such as, for example, a heat activated adhesive, and/or a pressure sensitive adhesive. These constructions are characterized by having an embossed, replicated, or a similarly formed sealing layer laminated to the back of the retroreflective layer. The sealing layer can be a pressure sensitive adhesive, heat activated adhesive, or other material that can be formed using replication, heat embossing, extrusion replication, or the like.

FIG. 3 is a schematic drawing of one exemplary embodiment of a retroreflective article 300 that faces viewer 302. Retroreflective article 300 includes a retroreflective layer 310 including multiple cube corner elements 312 that collectively form a structured surface 314 opposite a major surface 316. Retroreflective layer 310 also includes an overlay layer 318. Retroreflective layer 310 is shown as a flexible substrate without a land layer or land portion, but, as is described above, retroreflective layer 310 can include a land layer and/or optical elements of any type. A structured adhesive layer 330 is adjacent to retroreflective layer 310. Structured adhesive layer 330 includes raised areas (a region that is raised relative to a surrounding region) of adhesive in a closed pattern, such as, for example, a hexagonal array. Structured adhesive layer includes structured adhesive liner 340 and hot melt adhesive layer 350. Structured adhesive layer 330, when bonded to retroreflective layer 310, defines low refractive index layers 338 that retain the retroreflective nature of structured surface 314. More specifically, the presence of low refractive index layers 338 permit the portions of structured surface 314 adjacent to low refractive index layers 338 to retroreflect incident light 150. As such, portions of retroreflective article 300 that include cube corner elements 312 adjacent to low refractive index layers 338 are optically active in that they retroreflect incident light. In contrast, portions of retroreflective article 300 that have portions of structured adhesive layer 330 adjacent to cube corner elements 312 are optically inactive areas in that they do not substantially retroreflect incident light. Portions of structured adhesive layer 330 that are not in contact with structured surface 314 adhere to the cube corner elements 312, thereby effectively sealing the retroreflective areas to form optically active areas or cells. Structured adhesive layer 330 also holds the entire retroreflective construction together, thereby eliminating the need for a separate sealing layer and sealing process. In the embodiment shown in FIG. 3, retroreflective article 300 is adhesively bonded to an aluminum substrate 360 to form a license plate.

The structured adhesive layer can be formed in several different ways. The structured adhesive layer can include, for example, multiple layers formed at the same time or can be built through repeated coating steps. One exemplary method starts with a flat film of adhesive, optionally on a carrier web. The adhesive is nipped between a flat roll and a roll with the required relief pattern. With the addition of temperature and pressure, the relief pattern is transferred to the adhesive. A second exemplary method requires a castable or extrudable adhesive material. A film of the adhesive is created by extruding the material onto a roll with the required relief pattern. When the adhesive material is removed from the roll, it retains the relief pattern associated with the roll. The structured adhesive layer is then laminated to the retroreflective layer.

In an alternative embodiment, the structured adhesive layers can include, for example, a material that is not an adhesive but is coated with an adhesive on the tips of the structure.

An exemplary method of making such a retroreflective article 400 begins with a flat non-adhesive film such as, for example, polyethylene. The polyethylene film is nipped between a flat roll and a roll with the required relief pattern. With the addition of temperature and pressure, the relief pattern is transferred to the polyethylene film. An adhesive is then transferred to the tips of the replicated film using, for example, kiss coating or another suitable method. The adhesive covered structured liner is then laminated to the retroreflector.

Regardless of which manufacturing method described above is used, the structured adhesive layer is then bonded to the retroreflective layer by nipping the two films together in a nip consisting of two flat rolls. With the addition of temperature and pressure, the films adhesively bond, creating pockets of air that retain the retroreflection of the cube corner elements.

Optionally, the first region or unraised portions of the adhesive can be patterned with a material that acts to reduce the creep of the structured adhesive layer seal legs, as well as minimizing the detrimental affect of touchdown by the bottom of the well on the tips of the cube corner elements during processing or use. FIG. 5 shows a retroreflective article 500 in which a barrier layer 580 is limited to the bottom of the structured adhesive layer, but barrier layer 580 could be anywhere in the wells as long as it does not substantially reduce the adhesion of the seal legs to retroreflective layer 310.

Figure 4A:
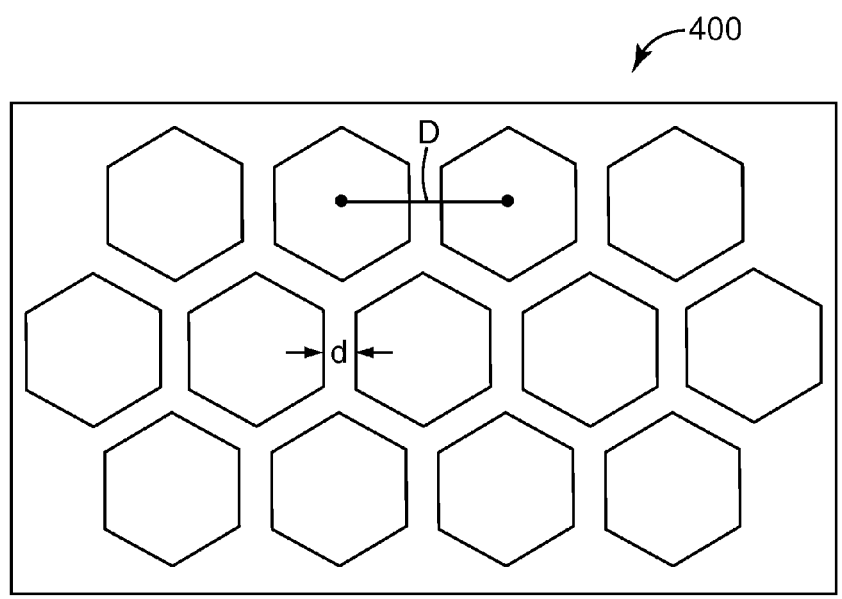
FIGS. 4A and 4B are schematic drawings of the pattern used in Examples 11-13.
Figure 4B:
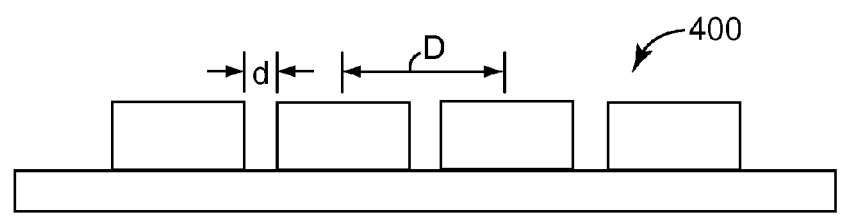

The structured adhesive layers of FIGS. 3-5 can include, for example, a thermoplastic polymer, a heat-activated adhesive, such as, for example, an acid/acrylate or anhydride/acrylate modified EVA's such as, for example, Bynel 3101, such as described in, for example, U.S. Pat. No. 7,611,251, the entirety of which is herein incorporated by reference. The structured adhesive layers of FIGS. 3-5 can include, for example, an acrylic PSA, or any other embossable material with adhesive characteristics that will adhere to the corner cube elements. The interface between the seal film layer and the (e.g. cube-corner) microstructured layer typically include an adhesion promoting surface treatment. Various adhesion promoting surface treatments are known and include for example, mechanical roughening, chemical treatment, (air or inert gas such as nitrogen) corona treatment (such as described in US2006/0003178A1), plasma treatment, flame treatment, and actinic radiation.

The coefficient of retroreflection $R_A$, sometimes referred to as retroreflectivity of retroreflective articles, of the present disclosure can be modified depending on the properties desired in an application. In some embodiments, $R_A$ meets the ASTM D4956-07e1 standards at 0 degree and 90 degree orientation angles. In some embodiments, $R_A$ is in a range from about 5 cd/(lux·m$^2$) to about 1500 cd/(lux·m$^2$) when measured at 0.2 degree observation angle and +5 degree entrance angle according to ASTM E-810 test method or CIE 54.2; 2001 test method. In some embodiments, such as in embodiments where the retroreflective article is used in a traffic control sign, a delineator, or a barricade, $R_A$ is at least about 330 cd/(lux·m$^2$), or at least about 500 cd/(lux·m$^2$), or at least about 700 cd/(lux·m$^2$) as measured according to ASTM E-810 test method or CIE 54.2; 2001 test method at 0.2 degree observation angle and +5 degree entrance angle. In some embodiments, such as in motor vehicle related applications, $R_A$ is at least about 60 cd/(lux·m$^2$), or at least about 80 cd/(lux·m$^2$), or at least about 100 cd/(lux·m$^2$) as measured according to ASTM E-810 test method or CIE 54.2; 2001 test method at 0.2 degree observation angle and +5 degree entrance angle.

Another way of measuring these unique optical features of the sheeting of the present application involves measuring the fractional retroreflectance $R_T$. Fractional retroreflectance ($R_T$) is another useful parameter for characterizing retroreflection. $R_T$, which is explained in detail in ASTM E808-01, is the fraction of unidirectional flux illuminating a retroreflector that is received at observation angles less than a designated maximum value, $\alpha_{max}$. Thus, $R_T$ represents the portion of light being returned within a prescribed maximum observation angle, $\alpha_{max}$. In a manner consistent with ASTM E808-01, $R_T$ can be calculated as follows:

$$R_T = \int_{\alpha=0}^{\alpha_{max}} \int_{\gamma=-\pi}^{\pi} \left(\frac{R_a}{\cos(\beta)}\right)(\alpha) d\gamma d\alpha,$$

where $\alpha$ is the observation angle (expressed in radians), $\gamma$ is the presentation angle (also expressed in radians), $\beta$ is the entrance angle, and $R_a$ is the conventional coefficient of retroreflection expressed in units of candelas per lux per square meter. For purposes of this application, $R_T$ refers to the fractional retroreflectance expressed as a decimal, and % $R_T$ refers to the fractional retroreflectance expressed as a percentage, i.e., % $R_T = R_T \times 100\%$. In either case, the fractional retroreflectance is unitless. As a graphical aid in understanding the observation angularity of a retroreflective sheeting, fractional retroreflectance may be plotted as a function of maximum observation angle, $\alpha_{max}$. Such a plot is referred to herein as an $R_T$-$\alpha_{max}$ curve, or a % $R_T$-$\alpha_{max}$ curve.

Another useful parameter for characterizing retroreflection is $R_T$ Slope, which can be defined as the change in $R_T$ for a small change or increment in the maximum observation angle, $\Delta\alpha_{max}$. A related parameter, % $R_T$ Slope, can be defined as the change in % $R_T$ for a small change in maximum observation angle, $\Delta\alpha_{max}$. Thus, $R_T$ Slope (or % $R_T$ Slope) represents the slope or rate of change of the $R_T$-$\alpha_{max}$ curve (or % $R_T$-$\alpha_{max}$ curve). For discrete data points these quantities may be estimated by calculating the difference in $R_T$ (or % $R_T$) for two different maximum observation angles $\alpha_{max}$, and dividing that difference by the increment in maximum observation angle, $\Delta\alpha_{max}$, expressed in radians. When $\Delta\alpha_{max}$ is expressed in radians, $R_T$ Slope (or % $R_T$ Slope) is the rate of change per radian. Alternatively and as used herein, when $\Delta\alpha_{max}$ is expressed in degrees, $R_T$ Slope (or % $R_T$ Slope) is the rate of change per degree in observation angle.

The equation given above for $R_T$ involves integrating the coefficient of retroreflection $R_A$ and other factors over all presentation angles ($\gamma=-\pi$ to $+\pi$) and over a range of observation angles ($\alpha=0$ to $\alpha_{max}$). When dealing with discrete data points this integration can be performed using $R_A$ measured at discrete observation angle $\alpha_{max}$ values (0.1 degrees) separated by increments $\Delta\alpha_{max}$.

In at least some embodiments of the present disclosure, the structured surface exhibits a total light return that is not less than about 5%, not less than 8%, not less than 10%, not less than 12%, not less 15% for incident visible light at an entrance angle of −4 degrees. In at least some of the embodiments of the present disclosure, the structured surface of the retroreflective article exhibits a coefficient of retroreflection RA that is not less than about 40 cd/(lux·m2), not less than 50 cd/(lux·m2), not less than 60 cd/(lux·m2), not less than 70 cd/(lux·m2), and not less than 80 cd/(lux·m2) for an observation angle of 0.2 degrees and an entrance angle of −4 degrees.

With appropriate choice of barrier layer materials, size, and/or spacing, the retroreflective articles of the present disclosure have a more uniform appearance than can be attained with conventional retroreflective articles including a sealing layer. Additionally, the retroreflective articles of the present disclosure do not require the inclusion or use of a sealing layer, reducing their cost.

The embodiments including seal structures of the type shown in, for example, FIGS. 3 and 5, have some additional specific advantages. For example, the seal legs can be made small enough so that they do not adversely affect the aesthetics of artwork or design printed on the surface of the retroreflective article or construction. Further, these methods of sealing do not substantially change the angular distribution of retroreflected light from the bare retroreflective layer. These methods also allow seal legs of arbitrary shape and color to be created. Consequently, retroreflective articles with a white appearance can be formed as well as articled with an anti-moire effect and/or security features. Lastly, the manufacturing process is streamlined because the vapor coat step is removed from the process.

Further, the retroreflective articles of the present disclosure have improved performance when compared to beaded sheeting. Prismatic sheeting is known in general to retroreflect a higher percentage of the incident light back towards the source when compared to glass bead based sheeting. (See, e.g., FIGS. 2 and 3 of "Driver-Focused Design of Retroreflective Sheeting for Traffic Signs", Kenneth Smith, 87th Annual Meeting of Transportation Research Board, Jan. 13-17, 2008, Washington, D.C.). When the retroreflected light is properly positioned with respect to observation angle, the result is a product with superior brightness and performance.

Microsealed cell geometries, shapes, sizes and structures may be uniform across the sheeting or may be varied in a controlled manner. Variations in cell geometry such as size, shape, and cell width can be used to intentionally introduce slight fluctuations in visual appearance at close distances (below 20 feet and preferably below 5 feet). Such fluctuations can have the effect of hiding occasionally defects which might be randomly distributed in the sheeting (contaminants, coating flaws, etc) or alternatively which might result from periodic structures in the tooling or product (for example, scale up or weld lines).

Microsealed prismatic sheeting is especially suitable in applications such as license plates and graphics. The prismatic sheeting provides benefits such as significantly lower manufacturing cost, reduced cycle time, and elimination of wastes including especially solvents and $CO_2$ when replacing glass bead sheeting. Furthermore, prismatic constructions return significantly increased light when compared to glass bead retroreflectors. Proper design also allows this light to be preferentially placed at the observation angles of particular importance to license plates, e.g. the range 1.0 to 4.0 degrees. Finally, micro sealed sheeting provides the brilliant whiteness and uniform appearance at close viewing distances needed in these product applications.

Seal cells can be characterized by a cell size dimension and a seal cell leg or line width. The cell sizes for the 3M HIP and 3M flexible prismatic products are about 0.143 inch and 0.195 inch, respectively. Seal leg widths for the same samples are about 0.018 inch and 0.025 inch, respectively. Another way to characterize characteristic cell size is to divide cell area by perimeter length. This characteristic cell size $D_c$ may be useful in comparing different cell geometries. These relatively large seal cell sizes are perfectly suitable for the applications in which they are normally utilized. Although the non-uniform appearance of the retroreflective sheeting having these cell sizes is obvious when viewed up close (e.g., at a distance of a few feet or in a hand held or in-office demo). However, the actual distances where this retroreflective sheeting is used are much greater. For example, critical sign distances (based on factors such as first and last look distances, sign placement and obstruction and legibility) are about 50 to 150 meters for right shoulder mounted signs. These critical distances represent the region where drivers are actually acquiring the information from highway signs. Individual seal cells are generally not visible at these critical distances based on visual acuity thresholds.

At a distance of one foot, the normal visual acuity of the human eye is about 0.0035 inch (88.9 micron). This means that if one had alternating black and white lines that were all about 89 micron wide, it would appear to most people as a mass of solid gray. (See, e.g., http://www.ndted.org/EducationResources/CommunityCollege/PenetrantTest/Introduction/visualacuity.htm). Alternatively, 20/20 vision is the visual acuity needed to discriminate two points separated by 1 arc minute—about 1/16 of an inch at 20 feet (See, e.g., http://en.wikipedia.org/wiki/Visual_acuity#Visual_acuity_expression). Hence for the approximate expected minimum viewing distances of about two feet, any feature below about 180 microns can not be resolved. Sheeting with discrete feature sizes below this level would appear uniform to the human eye.

Figure 7A:
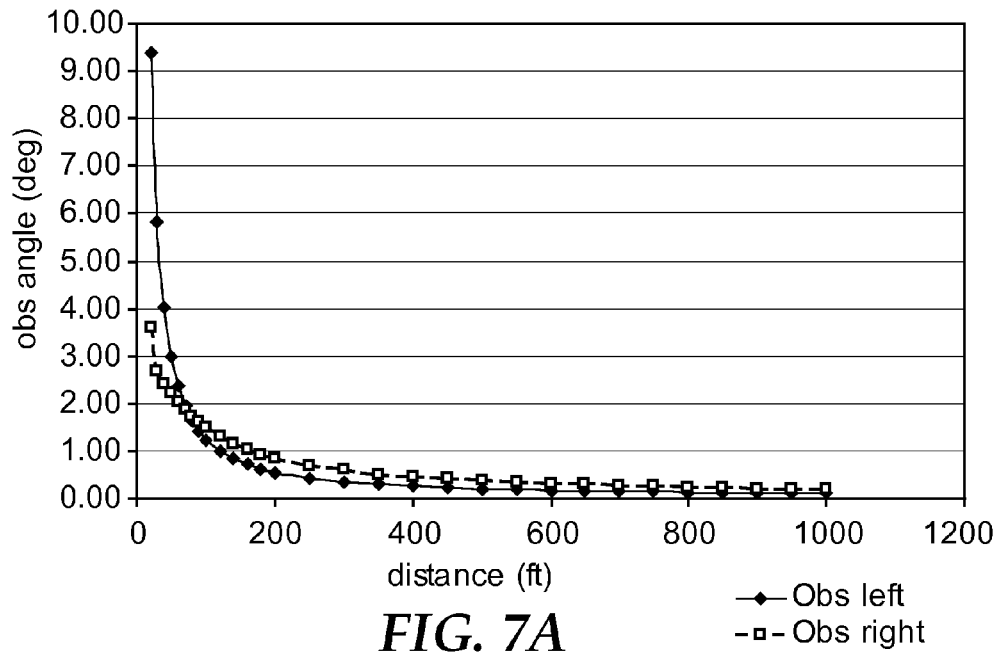
FIGS. 7A and 7B are plots showing observations angles versus distance for left and right headlights for a standard sedan.
Figure 7B:
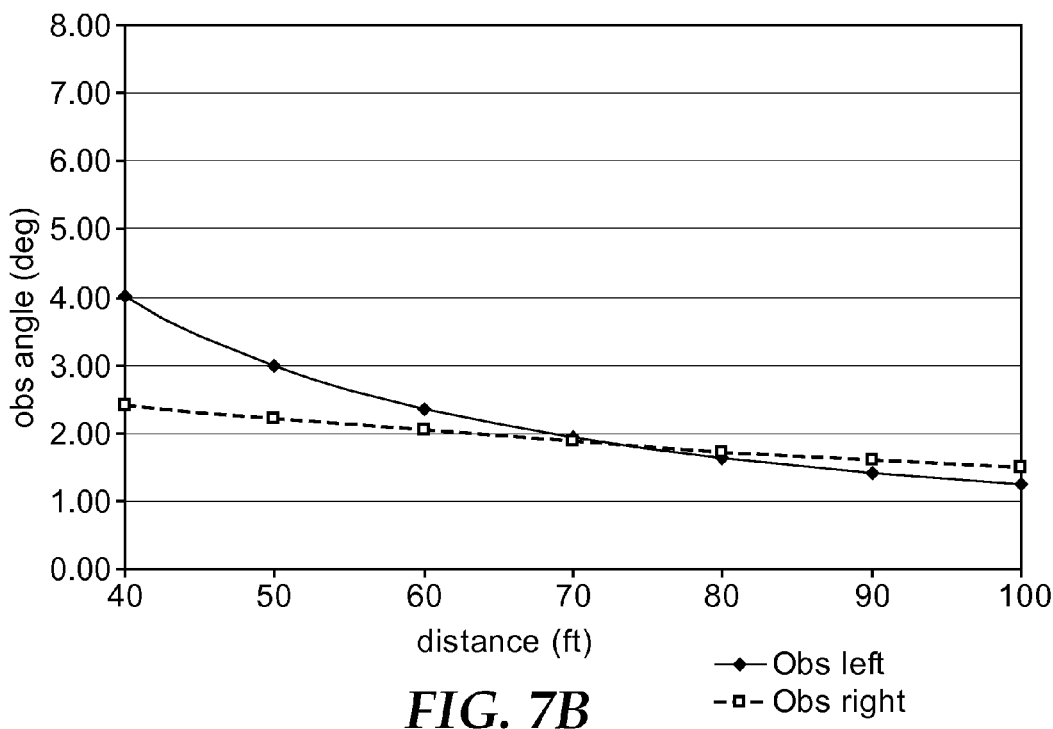

The alphanumeric letters used in license plates are relatively small compared to many road signing applications. For example, letter heights of about 2.75 inch and stroke width (thickness of the alpha numerics) 0.35 inch are common in the US. Similarly, letter heights of about 3.0 inch and stroke width 0.45 inch are common in the US. Visual acuity limits for black on white under ideal conditions, as described above, are about 0.0035 inch per foot of distance. Hence if the stroke width on US plates is about 0.35 inch then the maximum distance where these can be seen is about 100 feet. Contrast ratio between the alpha numeric and the background may decrease due to factors such as dirt pick up or graphic design (moving away from black letters on a white background). In such situations the maximum distance for reading the plate will further decrease. Real world variables such as poor illumination, moving vehicles, bad weather and poor eyesight can further and significantly reduce maximum legibility distance. It is therefore common in the license plate market to study in particular the legibility of plates in the critical license plate distance range of about 50 to 125 feet (15.2 to 38.1 meters). The observation angles of particular importance to license plates are roughly in the range of about 1.0 to about 4.0 degrees, as plotted in FIGS. 7A and 7B. In larger vehicles such as SUV's or large trucks, the drivers eyes are even further from the headlight when compared to standard sedans. Hence, in larger vehicles in the same scenarios the observation angles will be even larger.

Exemplary retroreflective articles include, for example, retroreflective sheeting, retroreflective signage (including, for example, traffic control signs, street signs, highway signs, roadway signs, and the like), license plates, delineators, barricades, personal safety products, graphic sheeting, safety vest, vehicle graphics, and display signage.

The following examples describe some exemplary constructions of various embodiments of the retroreflective articles and methods of making the retroreflective articles described in the present disclosure. The following examples are intended to be illustrative, but are not intended to limit the scope of the present disclosure.

EXAMPLES

Preparation of Retroreflective Layer

The overlay film was made by casting ethylene acid acrylate (EAA) (commercially available under the trade designation "Primacor 3440" from Dow Company of Midland, Mich.) as a film at a thickness of 0.01 cm (4 mil) onto a corona treated polyethylene terephthalate (PET) carrier approximately 53 in (134.6 cm) wide and 0.05 mm (0.002 in) thick. Pellets of EAA were fed into a 1.9 cm (¾ in) single screw extruder available from C. W. Brabender Instruments Inc., South Hackensack, N.J. The extruder temperature profile was from 140° C. (284° F.) to 175° C. (347° F.) resulting in a melt temperature of about 175° C. (347° F.). As the molten resin exited the extruder, it passed through a horizontal die (commercially available under the trade designation "Ultraflex-40" from Extrusion Dies Industries LLC, Chippewa Falls, Wis.) and was cast onto the PET carrier described above. The PET carrier was traveling at approximately 36 meters/min (120 ft/min). The resulting molten overlay film on the PET carrier was run between a rubber roll and a chilled steel backup roll to solidify the molten resin into a layer. The EAA surface was corona treated at an energy of 1.5 J/cm².

The cube corner structure had three sets of intersecting grooves with a pitch or primary groove spacing of 81.3 microns (0.0032 inch). The intersecting grooves form a cube corner base triangle with included angles of 61, 61, 58 degrees resulting in the height of the cube corner elements being 37.6 microns (0.00148 inch). The primary groove spacing is defined as the groove spacing between the grooves which form the two 61 degree base angles of the base triangle.

The cube corner microstructures were prepared using a resin composition formed by combining 25 wt-% bisphenol A epoxy diacrylate (commercially available under the trade designation "Ebecryl 3720" from Cytek, Woodland Park, N.J.), 12 wt-% dimethylaminoethyl acrylate ("DMAEA"), 38 wt-% TMPTA (trimethylol propane triacrylate) and 25 wt-% 1,6 HDDA (hexanediol diacrylate). The formulation had 0.5 pph of TPO (2,4,6-trimethylbenzoyl diphenylphosphine oxide) photoinitiator.

The resin composition was cast at room temperature at 25 fpm (7.6 m/min) onto a metal tool heated to 77° C. (170° F.). The resin composition filled the cavities of the cube corner microstructures in the tool via a rubber nip roller having a gap set to fill the cavities of the embossed pattern on the tool and minimize the amount of resin on the land area of the tool. A retroreflective layer was made by contacting the corona treated EAA film/PET carrier with the cube corner microstructures of the resin. The cube corner microstructure resin was cured through the PET carrier/EAA film on the tool with twelve Fusion D UV lamp (available from Fusion Systems, Rockville, Md.) set at 600 W/in. Dichroic filters were used in front of the UV lamps to minimize IR heating of the construction. Upon completion of the curing process and removal of the retroreflective layer from the tool, the cube corner microstructures were irradiated by a Fusion D UV lamp operating at 50% to provide a post-UV irradiation cure. The retroreflective layer was passed through an oven set at 127° C. (260° F.) to relax the stresses in the film.

Examples 1-15

A structured layer was prepared by creating structures onto a substrate layer. In some embodiments, structures were created by selectively applying (e.g., pattern printing, pattern coating) barrier materials (materials for use in the barrier layer) onto the substrate layer. Alternatively, barrier materials were applied on a release layer followed by lamination of the release layer containing the barrier materials to the substrate layer. In some embodiments, the structured layer was prepared by imparting a pattern onto the substrate layer with a tool. In some embodiments, the substrate layer is an adhesive layer. A retroreflective optical construction was prepared by laminating the structured layer to the retroreflective layer, wherein the barrier materials contacted the cube corner microstructures.

Comparative Examples A1 and A2

Retroreflective layers were prepared as described above, except that different lots of materials were used.

Examples 1-5

A radiation-polymerizable pressure sensitive adhesive (PSA) was prepared as described in U.S. Pat. No. 5,804,610 (Hamer), incorporated herein by reference. The PSA composition was made by mixing 95 parts by weight isooctyl acrylate (IOA), 5 parts by weight acrylic acid (AA), 0.15 parts by weight Irgacure 651 (commercially available from Ciba Corporation, now a BASF Company, N.J.), 0.10 parts by weight 4-acryloyl-oxy-benzophenone (ABP), 0.05 parts by weight isooctylthioglycolate (IOTG), and 0.4 parts by weight Irganox 1076 (commercially available from Ciba Corporation). The PSA composition was placed into packages made of a ethylene vinyl acetate copolymer film of 0.0635 mm thickness (commercially available under the trade designation "VA-24" from Pliant Corporation, Dallas, Tex.) measuring approximately 10 centimeters by 5 centimeters and heat sealed. The PSA composition was then polymerized. After polymerization, the PSA composition was compounded with 10% $TiO_2$ pigment and cast as a film onto a silicone release liner at a thickness of about 27 grains per 4 in by 6 in sample (11.3 $mg/cm^2$), as generally described in U.S. Pat. No. 5,804,610. The PSA film was then subjected to a radiation crosslinking step.

Figure 6:
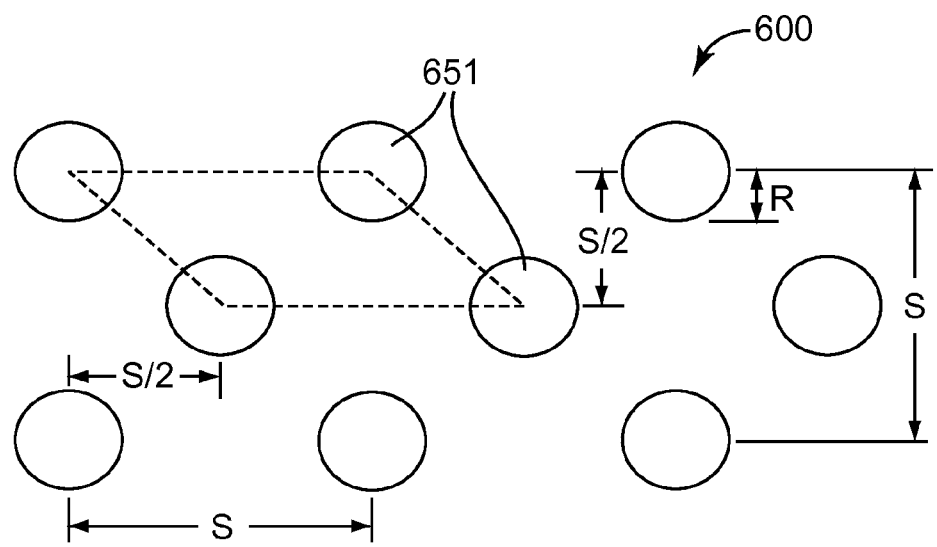
FIG. 6 is a schematic drawing of the pattern used in Examples 1-6.

Barrier materials were selectively printed onto the PSA film using a UV inkjet printer (commercially available under the trade designation "Mimaki JF-1631" from Mimaki, Suwanee, Ga.). Yellow inkjet ink (commercially available from Mimaki) was used as the barrier material. The printer was run using 8 passes, unidirectional printing, with the lamps set on High, and with a resolution of 600×600 dpi. The ink level was set to 100% or 300% ink laydown. A printing pattern comprising dots disposed in a rhomboid parallelogram shape, wherein each dot was centered in the vertex of the parallelogram, as schematically shown in FIG. 6, was used. Radius of the dots ranged from 400 to 600 μm, the distance between the centers of horizontally adjacent dots was "S" (pitch), and the distance between the centers of vertically adjacent dots was "S"/2. "S" ranged from 1418 to 2127 μm. Width of the printing pattern was calculated by subtracting 2R from the pitch value. Coverage area (% area) was calculated based on the relative amounts of printed and unprinted areas. Details on the patterns used to make Printed Adhesive Layers 1-5 are shown in Table 1, below.

TABLE 1

Ink level, Pitch "S", Dot Radius, Width, Pitch/width and Coverage Area for Printed Adhesive layers 1-5.

| | Ink level (%) | S (pitch) (μm) | Radius (μm) | Width (mm) | Pitch/Width | % Area |
|---|---|---|---|---|---|---|
| Printed Adhesive Layer 1 | 100 | 1418 | 400 | 618 | 2.29 | 50 |
| Printed Adhesive Layer 2 | 100 | 1554 | 500 | 554 | 2.81 | 65 |
| Printed Adhesive Layer 3 | 100 | 1772 | 500 | 772 | 2.30 | 50 |
| Printed Adhesive Layer 4 | 100 | 2127 | 600 | 927 | 2.29 | 50 |
| Printed Adhesive Layer 4 | 300 | 1772 | 500 | 772 | 2.30 | 50 |

Retroreflective optical constructions (Examples 1-5) were prepared by laminating Printed Adhesive Layers 1-5 to retroreflective layers using a hand squeeze roll laminator with a pressure setting of 40 psi (276 kPa), wherein the barrier materials contacted the cube corner microstructures of the retroreflective layer.

Retroreflectivity ($R_A$) of the samples prepared as described in Examples 1-5 was measured at observation angles of 0.2, 1.0 and 2.0 degrees, entrance angle of −4 degrees, and orientation of 0 degrees. Retroreflectivity of retroreflective layers (i.e., prior to laminating printed adhesive layers to the cube corner microstructures) ("Initial"), and Retroreflectivity of retroreflective optical constructions (i.e., after lamination of printed adhesive) ("Laminated") were measured, and are shown in Table 2, below.

TABLE 2

Retroreflectivity ($R_A$) of retroreflective layers (Initial) and retroreflective optical constructions (Laminated) prepared in Examples 1-5.

| | Initial (cd/lux · $m^2$) | | | Laminated (cd/lux · $m^2$) | | |
|---|---|---|---|---|---|---|
| | Observation angle/Entrance angle (°) | | | | | |
| | 0.2/−4 | 1/−4 | 2/−4 | 0.2/−4 | 1/−4 | 2/−4 |
| Example 1 | 385 | 130 | 14 | 73 | 26 | 4.2 |
| Example 2 | 350 | 122 | 14 | 102 | 38 | 6.3 |
| Example 3 | 373 | 124 | 13 | 68 | 28 | 4.7 |
| Example 4 | 347 | 123 | 12 | 70 | 27 | 4.5 |
| Example 5 | 375 | 124 | 12 | 220 | 79 | 11 |

Formation of optically active areas was dependent on the number and/or size of barrier materials printed on the PSA film. High coverage area (e.g., large number and/or large areas of barrier materials printed onto the PSA film), result in the creation of a higher percentage of optically active areas, thus increasing retroreflectivity.

Examples 6

A PSA composition was prepared as described in Examples 1-5, except that the monomer ratio was 90/10 IOA/AA and no $TiO_2$ was used. The PSA composition was cast as a film at a thickness of 0.8 $grains/in^2$ (7.95 $mg/cm^2$).

Printed Adhesive Layer 6 was prepared by printing a barrier material onto the PSA films using a square grid pattern, wherein each square was 500 by 500 μm. Pitch (distance between the center of each adjacent square) was 700 μm. The distance between each square (width) was 200 μm. Pitch to width ratio was 3.5. Ink level was 300%. Area coverage (% area) was calculated based on the size of the sample and the printed pattern, and corresponded to 51%.

A retroreflective optical construction (Example 6) was prepared by laminating Printed Adhesive Layer 6 to a retroreflective layer, as described in Examples 1-5.

Retroreflectivity was measured at an observation angle of 0.2 degrees, entrance angle of −4 degrees, and orientation of 0 and 90 degrees, and is shown in Table 3, below.

TABLE 3

Retroreflectivity at 0 and 90 degrees orientation for Comparative Example A, and Example 6.

| | Retroreflectivity (cd/lux · m$^2$) Orientation (degrees) | |
|---|---|---|
| | 0 | 90 |
| Comp. Ex. A1 | 124 | 124 |
| Example 6 | 62 | 64 |

Example 7

Barrier materials were printed onto a silicone coated release layer using the UV inkjet printer and yellow inkjet ink of Examples 1-5. The ink level used was 100%. The dot pattern described in Examples 1-5 was used, and is schematically shown in FIG. 6. Printed Release Layer 7 was prepared using the printing pattern detailed in Table 4, below.

TABLE 4

Distance "S", Dot Radius and Coverage Area for Printed Adhesive Layer 7.

| | S (μm) | Radius (μm) | % Area |
|---|---|---|---|
| Printed Release Layer 7 | 1418 | 400 | 50 |

Printed Adhesive Layer 7 was prepared by laminating Printed Release Layer 7 to a PSA film prepared as described in Examples 1-5. Retroreflective Optical Construction (Example 7) was prepared by laminating Printed Adhesive Layer 7 to a retroreflective layer.

Retroreflectivity was measured at observation angles of 0.2, 1 and 2 degrees, entrance angle of −4 degrees, and orientation of 0 degrees, and is shown in Table 5, below.

TABLE 5

Retroreflectivity of Comparative Example A and Example 7.

| | Initial (cd/lux · m$^2$) | | | Laminated (cd/lux · m$^2$) | | |
|---|---|---|---|---|---|---|
| | Obs. angle/Ent. Angle (°) | | | | | |
| | 0.2/−4 | 1/−4 | 2/−4 | 0.2/−4 | 1/−4 | 2/−4 |
| Comparative Example A2 | 355 | 122 | 13 | — | — | — |
| Example 7 | 360 | 130 | 13 | 59 | 21 | 3.5 |

Example 8

Barrier materials were created by screen printing (using an Accu-Print Printer available from A.W.T. World Trade, Inc., Chicago, Ill.) a white UV crosslinkable screen printing ink (commercially available under the trade designation "9808 Series" from 3M Company, St. Paul, Minn.) onto a silicone coated release layer. Using a 380 mesh screen, the dot printing pattern of Examples 1-5 was used to create the barrier materials. Printed Release Layer 8 was prepared using the printing pattern of Examples 1-5.

After screen printing, the barrier materials were cured using a UV curing station made by American Ultraviolet Company, Murray Hill, N.J., set at 226 mJ/cm$^2$ and run at 50 fpm (15.24 m/min).

Printed Adhesive Layer 8 was prepared by laminating Printed Release Layer 8 to a PSA film. Retroreflective Optical Construction 8 was prepared by laminating Printed Adhesive Layer 8 to a retroreflective layer.

Example 9

A structured layer was prepared as generally described in U.S. Pat. No. 6,254,675 (Mikami), and incorporated herein by reference, using an embossing roll. The embossing roll was laser machined to provide a pattern having the shape of a truncated, quadrangle pyramid having an exposed surface and a second quadrangle pyramid positioned on the exposed surface of the first pyramid, as shown in FIG. 4a of U.S. Pat. No. 6,254,675. The structure had a 200 μm pitch, 15 μm height, and 25 μm width, as generally described in Example 6 of U.S. Pat. No. 6,254,675. A polyethylene coated paper release liner having a silicone coating over the polyethylene, such as those available from Rexam or Inncoat, was embossed between a heated rubber roll and the embossing roll to produce a microstructured liner with ridges. The rubber roll was heated to a temperature of 110° C. and the release liner was heated to a surface temperature of 110° C. before entering the nip between the rubber roll and the embossing roll. The release liner traveled around approximately half of the embossing roll, and then onto a cold can which cooled the liner.

A coating composition comprised a vinyl solution with 10% solids, wherein a vinyl resin (commercially available under the trade designation "UCAR VYHH" from Dow Company, Midland, Mich.) was dissolved in methyl ethyl ketone (MEK). The coating composition was coated onto the structured layer to form Coated Release Layer 9. The line speed was 5 fpm (1.52 m/min), and the pump flow rate was 5 ml/min and the coating was dried in an oven set at 170° F. (77° C.).

Printed Adhesive Layer 9 were prepared by laminating Coated Release Layer 9 to a PSA film, prepared as described in Example 6. A retroreflective optical construction (Example 9) was prepared by laminating Printed Adhesive Layer 9 to a retroreflective layer.

Retroreflectivity was measured at observation angles of 0.2, 1 and 2 degrees, entrance angle of −4 degrees, and orientation of 0 and 90 degrees. Retroreflectivity is reported in Table 6 below, as an average of retroreflectivity at 0 and 90 degrees orientation.

TABLE 6

Average Retroreflectivity of Examples 9.

| | Retroreflectivity (cd/lux · m$^2$) Obs. angle/Ent. angle (°) | | |
|---|---|---|---|
| | 0.2/−4 | 1/−4 | 2/−4 |
| Example 9 | 42 | 23 | 11 |

Examples 10-13

The following description was used in preparing Examples 10-13: A laser ablation system generally described in U.S. Pat. No. 6,285,001 (Fleming), incorporated herein by reference, was used to impart a pre-determined pattern to a polymeric film. The laser ablation system comprised a KrF excimer laser emitting a beam with a wavelength of light of 248 nm, a patterned mask manufactured using standard semiconductor lithography mask techniques, and imaging lenses which projected an image of the pattern of light passing through the mask onto a substrate. The substrate comprised a 5 mil thick polyimide layer attached to a copper layer. The substrate was exposed to patterned radiation and the resulting structure in the polyimide layer comprised a pattern of hexagonal channels as shown in FIG. 4. Each hexagon was 0.731 mm wide and 0.832 mm long. The width of the channels, i.e., the distance between each adjacent wall of a neighboring hexagon was 0.212 mm (width d), and the distance between the center of one hexagon and the center of a neighboring hexagon was 0.943 mm (pitch D), as shown in FIG. 4A.

After cutting the pattern, a release treatment was applied to the substrate by first depositing a silicon containing film by plasma deposition, followed by coating a fluorochemical composition. Plasma deposition was carried out in a commercial Reactive Ion Etcher (model 3032, available from Plasmatherm) configured with a 26 in lower powered electrode and central gas pumping. The substrate was placed on the powered electrode and treated with an oxygen plasma by flowing oxygen gas at a flow rate of 500 standard $cm^3$/min and plasma power of 1000 watts for 30 seconds. After the oxygen plasma treatment, a silicon containing diamond-like glass film was deposited by flowing tetramethylsilane gas at a flow rate of 150 standard $cm^3$/min and oxygen gas at a flow rate of 500 standard $cm^3$/min for 10 seconds. After deposition of the diamond-like glass film, the substrate was exposed to an oxygen plasma at a flow rate of 500 standard $cm^3$/min for 60 seconds. A fluorochemical composition (commercially available under the trade designation "EGC-1720" from 3M Company, St. Paul, Minn.) was then applied to the substrate by manually dipping the substrate in the solution and allowing it to dry. The substrate was then heated in an oven at 120° C. for 15 minutes.

Comparative Examples B1 and B2

Retroreflective layers were prepared as described in Comparative Examples A1 and A2.

Example 10

A sealing layer comprising a two-layer construction of an acid/acrylate-modified ethylene vinyl acetate (EVA) polymer (commercially available under the trade designation "Bynel 3101" from Dow Corning, Michigan, USA) was prepared by coextrusion, wherein a first layer was clear and a second layer was pigmented due to the addition of $TiO_2$ during extrusion. Pellets of Bynel 3101 mixed with 20% by weight of a 80/20 $TiO_2$/EVA blend were fed into the extruder and cast as a white film at a thickness of 0.005 cm (2 mil) onto a PET carrier. The clear layer (i.e., without $TiO_2$) was cast as a film at a thickness of 0.002 cm (1 mil) and corona treated at an energy of about 1 $J/cm^2$.

Structures were created on the sealing layer by pressing the clear Bynel side of the previously described multilayer film onto the patterned polyimide layer in a hot press (commercially available under the trade designation (model "PW-220H" available from IHI Corporation, Houston, Tex.) for 3 minutes. Embossing temperatures for the top and bottom portions of the press were of about 230° F. (110° C.), and embossing pressure was 10 psi (69 kPa).

The structured sealing layer was subsequently laminated to the retroreflective layer, with the clear film adjacent the cube corner microstructures, forming a retroreflective optical construction. A heat press (model "N-800" from HIX Corporation, Pittsburg, Kans.) was used with a lamination temperature about 200° F., pressure of 30 psi (207 kPa), for 30 seconds.

Example 11

A sealing layer was prepared as described in Example 10, except that the structured sealing layer was coated with a low index coating material prior to lamination to the retroreflective layer.

The low index coating composition was prepared using a non-surface modified alkaline stabilized dispersion of M-5 silica (commercially available under the trade designation "Cabo-Sperse PG002" from Cabot of Bellerica, Mass.) and a polyvinyl alcohol (PVA) (commercially available under the trade designation "Poval 235" from Kuraray USA). This silica is characterized by its low surface area which is typically about 80-120 $m^2$/g. To a 1000 ml plastic beaker were added 150 g of a 7.2% solids PVA solution in water, 2.0 g of a nonionic surfactant (commercially available under the trade designation "Tergitol Min-Foam 1X" from Dow Chemical Company, Midland, Mich.), and 1 ml of a concentrated $NH_4OH$ solution. The solution was mixed at low shear using an air powered overhead laboratory mixer operating at low speed. The silica dispersion (216 g, 20% weight percent in water) was added to the solution, followed by the addition of 130 g of deionized water. The blend was allowed to mix for approximately 15 minutes. The blend, comprising 1 part of PVA to 4 parts silica on a dry weight basis, was then transferred to a 1 L round bottom flask and placed on a rotary evaporator at a temperature of about 40° C. and 600 mmHg vacuum. The final solids content of the low index coating composition was adjusted to 5% using deionized water.

The low index coating composition was coated onto the structured side of the sealing layer using a knife coater. The knife was set to provide zero land in the coating, meaning that excess silica was removed from the sealing layer. The sealing layer was placed in an oven at 50° C. for 10 minutes prior to lamination to the cube corner microstructures.

Retroreflectivity was measured at an observation angle of 0.2 degrees, entrance angle of −4 degrees, and orientation of 0 and 90 degrees. Retroreflectivity is reported in Table 7 below, as an average of retroreflectivity at 0 and 90 degrees orientation.

TABLE 7

Average Retroreflectivity of Comparative Example B1, and Examples 10-11.

| | Retroreflectivity (cd/lux · $m^2$) Observation angle/Entrance angle (°) 0.2/−4 |
|---|---|
| Comparative Example B1 | 434 |
| Example 10 | 388 |
| Example 11 | 381 |

Example 12

A PSA film was prepared as described in Examples 6. A structured adhesive film was obtained by pressing the adhesive film against the polyimide layer, as described in Example 10.

A retroreflective optical construction was prepared by laminating the structured adhesive film to the retroreflective layer, wherein the structured adhesive contacted the cube corner microstructures. Lamination occurred at room temperature using a hand roller.

Example 13

A structured adhesive film was prepared as described in Example 12, except that the low index coating composition of Example 11 was coated onto the structured adhesive. A retroreflective optical construction was prepared by laminating the coated structured adhesive film to the retroreflective layer at room temperature with a hand roller, wherein the adhesive side of the film contacted the cube corner microstructures.

Retroreflectivity was measured at an observation angle of 0.2 degrees, entrance angle of −4 degrees, and orientation of 0 and 90 degrees. Retroreflectivity is reported in Table 8 below, as an average of retroreflectivity at 0 and 90 degrees orientation.

TABLE 8

| Average Retroreflectivity of Comparative Example B2, Examples 12-13. | |
|---|---|
| | Retroreflectivity (cd/lux · m²) Observation angle/Entrance angle (°) 0.2/−4 |
| Comparative Example B2 | 212 |
| Example 12 | 120 |
| Example 13 | 64 |

Comparative Example C

A sealed prismatic retroreflective sheeting commercially available under the trade designation "Diamond Grade 3910" by 3M Company, St. Paul, Minn., was obtained.

Comparative Example D

A beaded retroreflective sheeting commercially available under the trade designation "License Plate Sheeting Series 4770" by 3M Company, was obtained.

Comparative Example E

A sealing layer prepared as described in Example 10 was obtained.

Comparative Examples F, G and H, and Examples 14-19

The following description was used in preparing Comparative Examples F, G, and H, and Examples 14-19: A retroreflective layer was prepared as described in "Preparation of Retroreflective Layer", except that the cube structure had three sets of intersecting grooves with a pitch or primary groove spacing of 101.6 microns (0.004 inch). The intersecting grooves form a cube corner base triangle with included angles of 58, 58, 64 degrees resulting in the height of the cube corner elements being 49.6 microns (0.00195 inch). The primary groove spacing is defined as the groove spacing between the grooves which form the two 58 degree base angles of the base triangle.

Comparative Example F and G were prepared as described in "Preparation of Retroreflective Layer", except that the above-mentioned cube corner structure was used.

Comparative Example H was prepared by laminating the retroreflective layer of Comparative Examples F and G to the sealing layer of Example 10.

Figure 8:
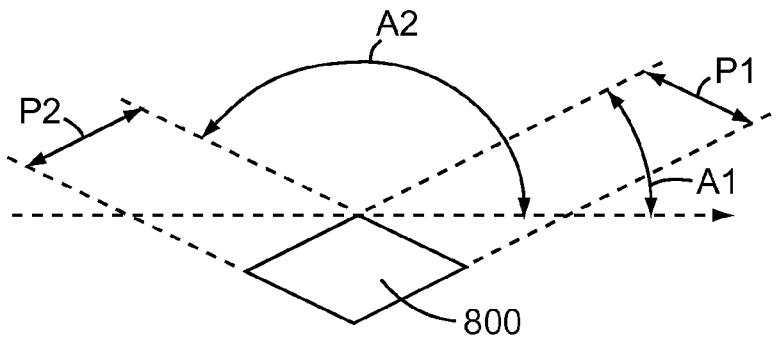
FIG. 8 is a schematic drawing of the pattern used in Examples 14-19.
Figure 9:
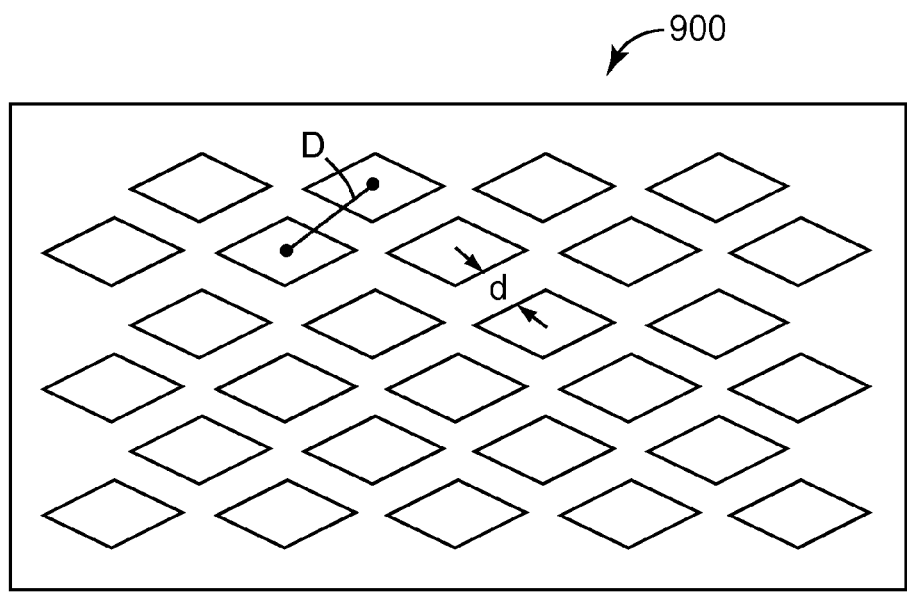
FIG. 9 is a schematic drawing of the pattern used in Examples 14-19.

Polyimide layers (Tools 1-6) were prepared, except that the pattern shape was that of a diamond, shown in FIG. 8 and FIG. 9, wherein angle 1 (A1) and angle 2 (A2) were respectively 20 and 153 degrees. Dimensional characteristics of Tools 1-6 are shown in Table 9, below. The sealed retroreflective sheeting of Comparative Example C was analyzed and the pitch and line width of the seal pattern was measured, and is reported in Table 9, below.

TABLE 9

Dimensional characteristics of Tools 1-6, and Comparative Example C.

| | Line width (μm) | Pitch (μm) | Area/perimeter | d/D (pitch/width) | % coverage |
|---|---|---|---|---|---|
| Tool 1 | 260 | 680 | 205 | 2.61 | 31 |
| Tool 2 | 200 | 680 | 205 | 3.40 | 37 |
| Tool 3 | 193 | 680 | 205 | 3.52 | 37 |
| Tool 4 | 156 | 680 | 205 | 4.36 | 45 |
| Tool 5 | 225 | 1165 | 343 | 5.18 | 59 |
| Tool 6 | 210 | 1265 | 316 | 6.02 | 64 |
| Comp. Example C | 685 | 5511 | 1294 | 8.04 | 75.12 |

First generation negative toolings were made from the polyimide layers (master) by nickel electroforming the polyimide layer in a nickel sulfamate bath as generally described in U.S. Pat. No. 4,478,769 (Pricone) and U.S. Pat. No. 5,156,863 (Pricone). Additional multigenerational positive and negative copies were formed such that the tooling had substantially the same geometry as the master.

Structured Sealing layers 14-19 were prepared by pressing the sealing layer of Example 10 on Tools 1-6, as generally described in Example 10.

Retroreflective optical constructions (Examples 14-19) were prepared by laminating Structured Sealing layers 14-19 to retroreflective layers.

Retroreflectivity ($R_A$) was measured at observation angles of 0.2, 0.5, 1, 2, 3, and 4 degrees, entrance angle of −4 degrees, and orientation of 0 and 90 degrees. Retroreflectivity is reported in Table 10 below, as an average of retroreflectivity at 0 and 90 degrees orientation.

TABLE 10

Average Retroreflectivity of Comparative Examples C, D, F, and G, and Examples 14-19

| | RA (cd/lux · m2) Observation angle (°) | | | | | |
|---|---|---|---|---|---|---|
| | 0.2 | 0.5 | 1 | 2 | 3 | 4 |
| Example 14 | 167 | 69 | 50 | 10 | 4 | 4 |
| Example 15 | 205 | 87 | 56 | 10 | 4 | 4 |
| Example 16 | 207 | 84 | 60 | 12 | 4 | 4 |
| Example 17 | 305 | 128 | 74 | 13 | 5 | 4 |
| Example 18 | 268 | 116 | 97 | 17 | 5 | 5 |
| Example 19 | 324 | 140 | 103 | 17 | 5 | 5 |

TABLE 10-continued

Average Retroreflectivity of Comparative Examples C, D, F, and G, and Examples 14-19

| | RA (cd/lux · m2) Observation angle (°) | | | | | |
|---|---|---|---|---|---|---|
| | 0.2 | 0.5 | 1 | 2 | 3 | 4 |
| Comparative Example C | 799 | 586 | 47 | 13 | 3 | 4 |
| Comparative Example D | 110 | 48 | 17 | 8 | 4 | 4 |
| Comparative Example F | 547 | 239 | 159 | 20 | 6 | 5 |
| Comparative Example G | 648 | 258 | 140 | 20 | 7 | 5 |

Retroreflectivity ($R_A$) is typically measured at discrete observation angles and averaged over the annular region between two adjacent measured observation angles. Incremental % RT for a given observation angle is determined by multiplying this average $R_A$ by the area of this annular region divided by the cosine of the entrance angle. Fractional retroreflectance % RT is the sum of incremental % RT for observation angles between 0 and the observation angle of interest (αmax). Fractional retroreflectance slope (% RT slope) for a given observation angle is the incremental % RT divided by the difference between the adjacent observation angles. % RT slope was calculated and is reported in Table 11 below.

TABLE 11

% RT slope of Comparative Examples C, D, F, and G, and Examples 14-19.

| | % RT Slope Observation angle (°) | | | | | |
|---|---|---|---|---|---|---|
| | 0.2 | 0.5 | 1 | 2 | 3 | 4 |
| Example 14 | 4.7% | 6.1% | 10.4% | 4.0% | 2.0% | 1.7% |
| Example 15 | 5.9% | 7.4% | 12.2% | 4.2% | 1.9% | 1.6% |
| Example 16 | 5.9% | 7.4% | 12.6% | 4.8% | 2.4% | 1.9% |
| Example 17 | 8.9% | 10.4% | 16.7% | 5.6% | 2.3% | 1.8% |
| Example 18 | 7.5% | 10.6% | 18.4% | 6.7% | 3.1% | 2.1% |
| Example 19 | 9.2% | 12.4% | 20.9% | 7.0% | 3.0% | 2.1% |
| Comparative Example C | 23.4% | 46.5% | 13.8% | 3.6% | 1.70% | 1.60% |
| Comparative Example D | 2.3% | 4.3% | 2.4% | 2.1% | 1.0% | 0.5% |
| Comparative Example F | 15.9% | 20.6% | 33.0% | 9.2% | 3.5% | 2.2% |
| Comparative Example G | 19.1% | 21.3% | 31.6% | 9.4% | 3.9% | 2.6% |

% RT was calculated and is reported in Table 12 below.

TABLE 12

% RT of Comparative Examples C, D, F and G, and Examples 14-19.

| | % RT Slope Observation angle (°) | | | | | |
|---|---|---|---|---|---|---|
| | 0.2 | 0.5 | 1 | 2 | 3 | 4 |
| Example 14 | 0.6% | 2.5% | 6.8% | 12.5% | 15.3% | 16.9% |
| Example 15 | 0.7% | 3.1% | 8.3% | 14.8% | 17.5% | 19.0% |
| Example 16 | 0.7% | 3.1% | 8.4% | 15.2% | 18.5% | 20.4% |
| Example 17 | 1.1% | 4.5% | 12.0% | 20.5% | 23.9% | 25.8% |
| Example 18 | 0.9% | 4.2% | 11.6% | 21.8% | 26.1% | 28.5% |
| Example 19 | 1.1% | 5.0% | 13.7% | 24.5% | 28.8% | 31.1% |
| Comparative Example C | 3.0% | 14.4% | 29.3% | 35.0% | 37.6% | 39.0% |
| Comparative Example D | 0.3% | 1.5% | 2.9% | 5.7% | 7.2% | 7.9% |
| Comparative Example F | 1.9% | 8.3% | 22.8% | 38.6% | 43.9% | 46.4% |
| Comparative Example G | 2.4% | 9.4% | 24.2% | 38.6% | 44.3% | 47.2% |

CAP-Y was measured on a color measurement spectrophotometer (available under the trade designation "Color-Flex" from Hunterlab, Reston, Va.). All samples were measured with a white background behind the sample. There is a linear relationship between CAP-Y and % coverage (i.e., % area that is retroreflective), as increased % coverage results in decreased CAP-Y. Decreasing the amount of cube corner microstructures that are exposed (i.e., decreasing % coverage), results in an increase in whiteness of the construction. Typical CAP-Y values for license plate sheeting are equal to 50 or greater. CAP-Y values of Comparative Examples C, E, F, and H, and Examples 14-19, are shown in Table 13, below.

TABLE 13

CAP-Y values of Comparative Examples C, E, F, and H, and Examples 14-19

| | CAP-Y | % coverage |
|---|---|---|
| Example 14 | 70.93 | 31 |
| Example 15 | 68.7 | 37 |
| Example 16 | 64.97 | 37 |
| Example 17 | 62.63 | 45 |
| Example 18 | 59.49 | 59 |
| Example 19 | 57.09 | 64 |
| Comparative Example C | 53.97 | 75 |
| Comparative Example E | 90.59 | 0 |
| Comparative Example F | 41.15 | 100 |
| Comparative Example H | 85.94 | 0 |

As shown in Tables 10, 12, and 13, a decrease in the amount of exposed cube corner microstructures (e.g., by printing or laminating a structured film to the cube corner microstructures) results in a decreased amount of light returned, as seen in fractional retroreflectance % RT at 2, 3 and 4 degrees observation angle.

Another way to characterize the dimension of the samples is to use the seal cell pitch to line width ratio (D/d). The pitch D is the distance between the smallest repeating features in the pattern. It can also be called seal cell size or characteristic cell size. The width d is the width of the seal legs. The effect of the pitch/width ratio (D/d) on CAP-Y and % RT slope at 2, 3 and 4 degrees is shown in Tables 10, 11, and 13.

Microsealed retroreflective optical constructions are particularly useful for providing brilliant whiteness and uniform appearance at close viewing distances while exhibiting excellent retroreflective performance. One additional important aspect of the small or micro seal cell approach is that as the geometry of the seal cells (e.g., cell size (D), leg width (d)) and the total amount of light returned is reduced, the light distribution remains relatively unchanged. Sealed retroreflective optical constructions show a drop in total light return, however the light distribution profile remains the same.

As it will be understood by one of ordinary skill in the art, the shape of the seal cell is not limited to the diamond shapes presented in the above examples. The shape of seal cells may include, for example, circles, ovals, triangles, squares, and parallelograms. Virtually any shape that meets the characteristic dimension, % coverage, or pitch/width considerations shown above, or in any combination thereof, could be used. Seal cells could also have the shape of letters or images, such as an inverted 'M' or '3M' as security features.

Any geometric parameter used to define the seal cell shape including pitch, line width, angle, straightness, can be randomized to reduce the effects of moiré between the seal cells and the retroreflective sheeting. The geometry could also be optimized to hide defects in the sheeting, as well as layup or weld lines.

Additionally, the size or pitch, P, of the cubes may affect the brightness when laminated to the sealing layer due to the formation of edge effects during sealing. Two parameters can be used to help understand cube size effects: actual cell line width(d) and an effective cell line width (deff). The actual line width d is the physical width of the material that creates the seal cell leg. The effective line width deff is the optical width of the seal legs, and is dependent on the size and geometry of the cube corners used in the prismatic film to which the sealing layer is laminated. When the sealing layer is laminated to the retroreflective layer, the part of the seal leg that overlaps only part of the cube corner microstructure darkens the whole cube. This additional darkened area makes the effective width wider than the actual width. This effect is very dependent on the size of the cubes, the effect being much worse for large cubes.

The recitation of all numerical ranges by endpoint is meant to include all numbers subsumed within the range (i.e., the range 1 to 10 includes, for example, 1, 1.5, 3.33, and 10).

All references mentioned herein are incorporated by reference.

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:

1. A retroreflective article, comprising:
a retroreflective layer including multiple cube corner elements that collectively form a structured surface that is opposite a major surface; and
a sealing layer having a first region and a second region, wherein the second region is in contact with the structured surface and wherein the second region surrounds the first region to form at least one cell with a cell size; and
wherein the sealing layer includes a barrier layer disposed within the first region between the sealing layer and the retroreflective layer separating a low refractive index layer from the sealing layer;
wherein the low refractive index layer is between the barrier layer of the first region and the structured surface of the retroreflective layer, wherein the first region has a cell size that is less than 1000 microns; and wherein the CAP-Y is greater than 55.

2. The retroreflective article of claim 1, wherein the cell size for the first region is less than 750 microns.

3. The retroreflective article of claim 1, further including a seal leg that defines the first region.

4. The retroreflective article of claim 1, wherein the retroreflective article exhibits a total light return that is not less than about 5% for incident visible light at an entrance angle of −4 degrees.

5. The retroreflective article of claim 1, wherein the retroreflective article exhibits a coefficient of retroreflection $R_A$ that is not less than about 40 cd/(lux·m$^2$) for an observation angle of 0.2 degrees and an entrance angle of −4 degrees.

6. The retroreflective article of claim 1, wherein the retroreflective article exhibits a coefficient of retroreflection $R_A$ that is not less than about 8 cpl for an observation angle of 2.0 degrees and an entrance angle of −4 degrees.

7. The retroreflective article of claim 1, wherein the retroreflective article exhibits a % $R_T$ slope that is not less than about 3%/degree for an entrance angle of −4 degrees and an observation angle of 2 degrees.

8. The retroreflective article of claim 1, wherein the retroreflective article exhibits a coefficient of retroreflection $R_A$ that is not less than about 4 cpl for an observation angle of 3.0 degrees and an entrance angle of −4 degrees.

9. The retroreflective article of claim 1, wherein the retroreflective article exhibits a % $R_T$ slope that is not less than about 1.5%/degree for an entrance angle of −4 degrees and an observation angle of 3 degrees.

10. The retroreflective article of claim 1, wherein less than about 65% of the structured surface is retroreflective.

11. The retroreflective article of claim 1, wherein the cube corner elements are truncated cube corner elements.

12. The retroreflective article of claim 1, wherein the sealing layer has a first region and a second region and wherein the second region is raised relative to the first region and is in contact with the structured surface.

13. The retroreflective article of claim 1, wherein the retroreflective article exhibits a coefficient of retroreflection RA that is not less than about 40 cd/(lux m$^2$) for an observation angle of 0.2 degrees and an entrance angle of −4 degrees.

14. The retroreflective article of claim 1, wherein the retroreflective article exhibits a coefficient of retroreflection RA that is not less than about 20 cpl for an observation angle of 1.0 degrees and an entrance angle of −4 degrees.

15. The retroreflective article of claim 1, wherein the retroreflective article exhibits a % $R_T$ slope that is not less than about 9% degree for an entrance angle of −4 degrees and an observation angle of 1 degree.

16. The retroreflective article of claim 1, wherein the retroreflective article exhibits a coefficient of retroreflection RA that is not less than about 8 cpl for an observation angle of 2.0 degrees and an entrance angle of −4 degrees.

17. The retroreflective article of claim 1, wherein the retroreflective article exhibits a % $R_T$ slope that is not less than about 3%/degree for an entrance angle of −4 degrees and an observation angle of 2 degrees.

18. The retroreflective article of claim 1, wherein the retroreflective article exhibits a % $R_T$ slope that is not less than about 1.5%/degree for an entrance angle of −4 degrees and an observation angle of 3 degrees.

19. The retroreflective article of claim 1, comprising numerous cells that form one of an irregular pattern, a random pattern, a regular pattern, a grid, words, graphics, images, lines, and intersecting zones and wherein the distance between cells provides an angle of 1 arc minute or less when viewed at 20 feet.

* * * * *

UNITED STATES PATENT AND TRADEMARK OFFICE
CERTIFICATE OF CORRECTION

Page 1 of 2

PATENT NO. : 9,618,663 B2
APPLICATION NO. : 13/641271
DATED : April 11, 2017
INVENTOR(S) : Kenneth Smith et al.

It is certified that error appears in the above-identified patent and that said Letters Patent is hereby corrected as shown below:

On the Title Page

Column 2
Page 3 (Other Publications), Line 16, Delete "Nanopourous" and insert -- Nanoporous --, therefor.

In the Specification

Column 2
Line 18, Delete "Bandrup," and insert -- Brandrup, --, therefor.
Line 57, Delete "Controled" and insert -- Controlled --, therefor.

Column 3
Line 42, After "the" delete "to".

Column 5
Line 59, Delete "Bandrup" and insert -- Brandrup --, therefor.

Column 7
Line 41, Delete "poly(vinychloride);" and insert -- poly(vinylchloride); --, therefor.

Column 20
Line 23, Delete "Bellerica," and insert -- Billerica, --, therefor.

Column 25
Line 18, Delete "width(d)" and insert -- width (d) --, therefor.

Signed and Sealed this
Twenty-second Day of August, 2017

Joseph Matal
*Performing the Functions and Duties of the
Under Secretary of Commerce for Intellectual Property and
Director of the United States Patent and Trademark Office*

In the Claims

Column 26
Line 37, In Claim 13, delete "cd/(lux m$^2$)" and insert -- cd/(lux·m$^2$) --, therefor.
Line 46, In Claim 15, delete "9% degree" and insert -- 9%/degree --, therefor.